United States Patent [19]

Diller et al.

[11] Patent Number: 5,216,607
[45] Date of Patent: Jun. 1, 1993

[54] METHOD AND APPARATUS FOR SENSING A VEHICLE CRASH USING ENERGY AND VELOCITY AS MEASURES OF CRASH VIOLENCE

[75] Inventors: Robert W. Diller, Pasadena; Mark A. Ross, Glendale, both of Calif.; Brian K. Blackburn, Rochester; Joseph F. Mazur, Washington, both of Mich.

[73] Assignee: TRW Vehicle Safety Systems Inc., Lyndhurst, Ohio

[21] Appl. No.: 520,417

[22] Filed: May 11, 1990

Related U.S. Application Data

[63] Continuation-in-part of Ser. No. 358,875, May 30, 1989, Pat. No. 4,979,763.

[51] Int. Cl.⁵ ..................... B60R 21/32; B60R 21/00
[52] U.S. Cl. .................... 364/424.05; 280/735; 340/436; 307/10.1
[58] Field of Search ............ 364/424.01, 424.05, 364/557; 340/436, 438; 280/728, 734, 735; 180/232, 268, 271, 274, 282; 307/9.1, 10.1

[56] References Cited

U.S. PATENT DOCUMENTS

| | | | |
|---|---|---|---|
| 3,762,495 | 10/1973 | Usui et al. | 280/735 |
| 3,848,695 | 11/1974 | Lacaze, Jr. | 340/52 H |
| 3,870,894 | 3/1975 | Brede et al. | 340/52 H |
| 3,911,391 | 10/1975 | Held et al. | 180/274 |
| 3,914,584 | 10/1975 | Pietras et al. | 73/178 R |
| 4,346,914 | 8/1982 | Livers et al. | 280/735 |
| 4,410,875 | 10/1983 | Spies et al. | 280/735 |
| 4,467,651 | 8/1984 | Peters et al. | 73/497 |
| 4,497,025 | 1/1985 | Hannoyer | 364/424.05 |
| 4,620,442 | 11/1986 | MacGugan et al. | 73/517 R |
| 4,638,179 | 1/1987 | Mattes et al. | 280/735 |
| 4,684,928 | 8/1987 | Takahashi et al. | 340/52 H |
| 4,699,006 | 10/1987 | Boxenhorn | 73/517 AV |
| 4,842,301 | 6/1989 | Feldmaier | 280/735 |
| 4,884,652 | 12/1989 | Vollmer | 180/274 |
| 4,975,850 | 12/1990 | Diller | 364/424.05 |
| 4,979,763 | 12/1990 | Blackburn | 280/735 |
| 4,994,972 | 2/1991 | Diller | 364/424.05 |
| 5,021,678 | 6/1991 | Diller | 307/10.1 |
| 5,036,467 | 7/1991 | Blackburn et al. | 364/424.05 |
| 5,040,118 | 8/1991 | Diller | 364/424.05 |
| 5,065,322 | 11/1991 | Mazur et al. | 364/424.05 |
| 5,109,341 | 4/1992 | Blackburn et al. | 364/424.05 |

FOREIGN PATENT DOCUMENTS 0064888 3/1982 European Pat. Off.
0305654 5/1988 European Pat. Off.

OTHER PUBLICATIONS

"Discrete-Time Signal Processing", by Oppenheim, et al., Prentice-Hall, NJ, Dec. 31, 1989.
IC Sensor Article "A Miniature Silicon Accelerometer With Built-In Damping", by Stephen Terry, Dec. 31, 1988.
SAE Paper N. 720035 "Comparative Analysis of Crash Sensors", by Jones, et al., Jan. 10–14, 1972.

Primary Examiner—Parshotam S. Lall
Assistant Examiner—Thomas S. Auchterlonie
Attorney, Agent, or Firm—Tarolli, Sundheim & Covell

[57] ABSTRACT

A method and apparatus is disclosed for providing a passenger restraint actuation signal for use in an actuatable passenger restraint system in a vehicle is provided. The method comprises a sensor for providing a time varying electric signal proportional to vehicle deceleration. A crash energy is determined and compared against a predetermined limit. If the determined crash energy equals or exceeds the predetermined limit, a passenger restraint actuation signal is provided.

104 Claims, 7 Drawing Sheets

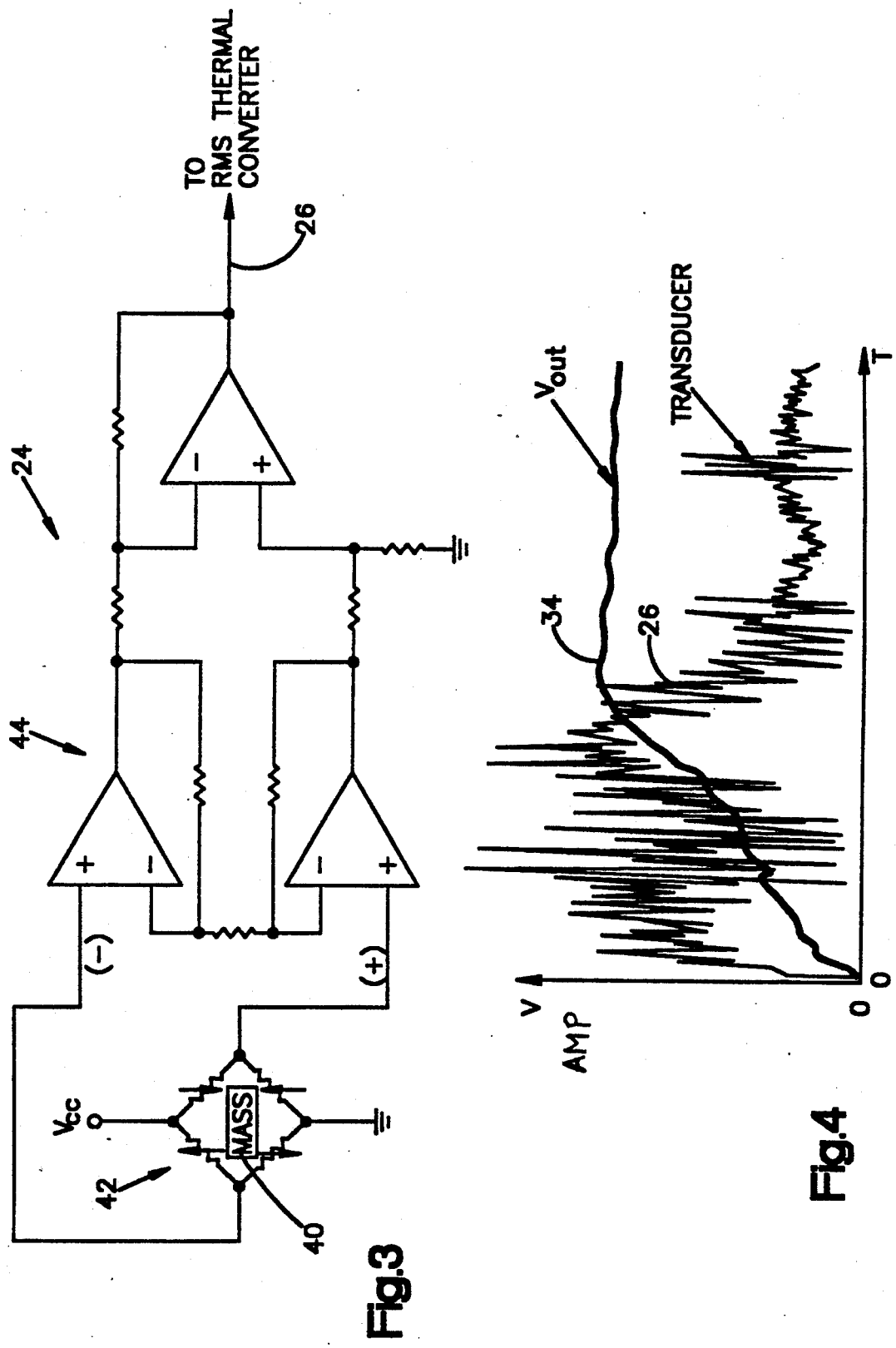

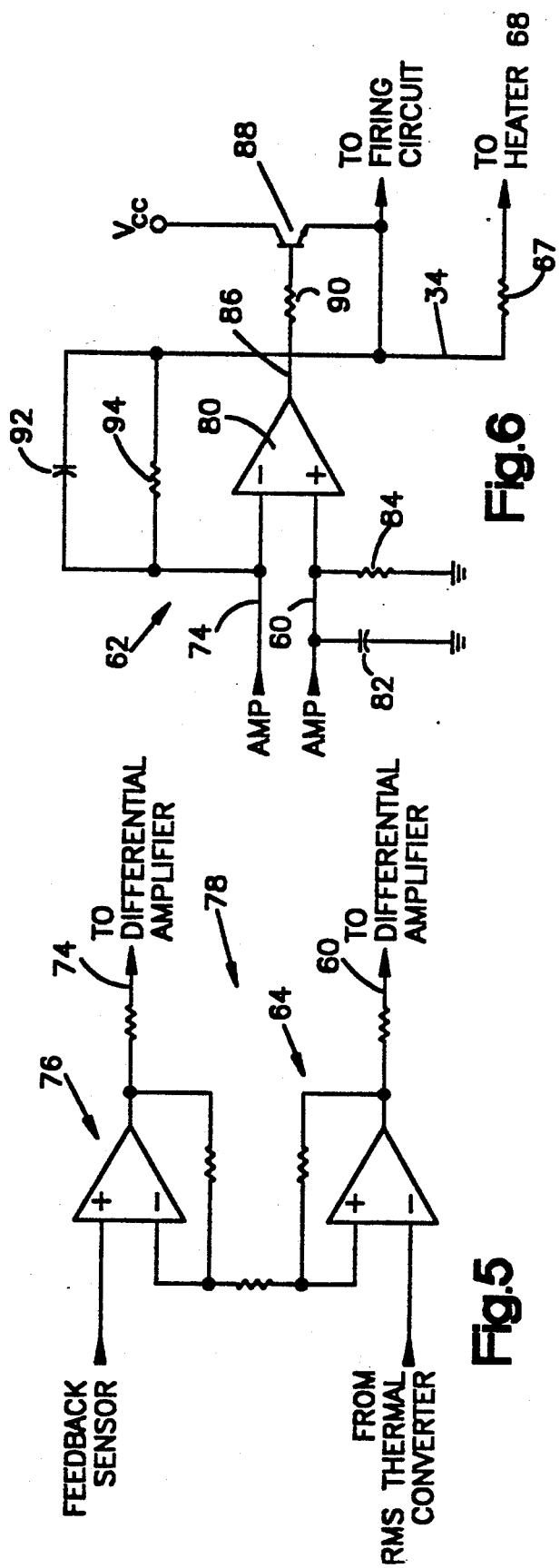
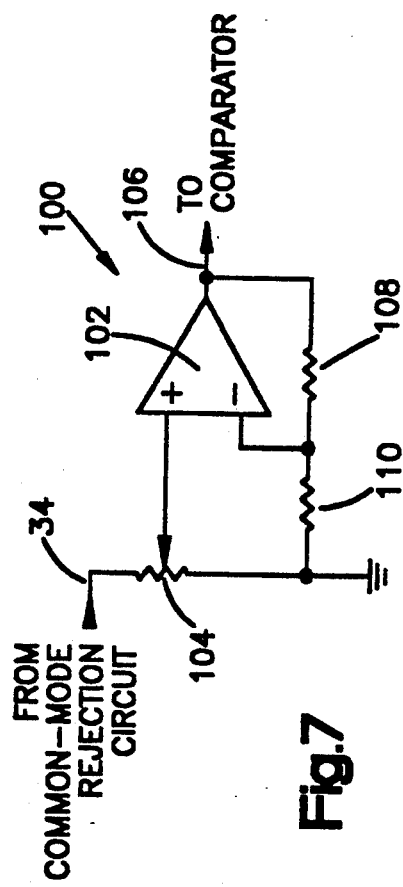
Fig.6
Fig.5
Fig.7

METHOD AND APPARATUS FOR SENSING A VEHICLE CRASH USING ENERGY AND VELOCITY AS MEASURES OF CRASH VIOLENCE

RELATED APPLICATION

This application is a continuation-in-part of U.S. patent application Ser. No. 358,875, filed May 30, 1989, entitled "METHOD AND APPARATUS FOR SENSING A VEHICLE CRASH" filed in the name of Brian K. Blackburn which is now U.S. Pat. No. 4,979,763, issued Dec. 25, 1990

TECHNICAL FIELD

The present invention is directed to an actuatable passenger restraint system for a vehicle and is particularly directed to a method and apparatus for sensing a vehicle crash using signal processing to derive measures of crash violence from energy and from a combination of energy and velocity. Upon determination of an occurrence of a sufficiently violent vehicle crash condition using the signal processing method and apparatus of the present invention, a passenger restraint actuation signal is provided.

BACKGROUND OF THE INVENTION

Actuatable passenger restraint systems for vehicles are well known in the art. One particular type of actuatable passenger restraint system includes an inflatable air bag mounted within the passenger compartment of the vehicle. The air bag has an associated, electrically actuatable ignitor, referred to as a squib. Such systems further include an inertia sensing device for measuring the deceleration of the vehicle. When the inertia sensing device is subjected to a forcing function greater than a predetermined value, the inertia sensing device closes an electrical switch causing an electric current of sufficient magnitude and duration to be passed through the squib to ignite the squib. The squib, when ignited, ignites a combustible gas generating composition or pierces a container of pressurized gas, which results in inflation of the air bag.

Many known inertia sensing devices used in actuatable passenger restraint systems are mechanical in nature. Such devices are typically mounted to the vehicle frame and include a pair of mechanically actuatable switch contacts and a resiliently biased weight. The weight is arranged such that when the vehicle decelerates, the weight physically moves relative to its mounting. The greater the amount and duration of the deceleration, the further the weight moves against the bias force. The switch contacts are mounted relative to the biased weight such that, when the weight moves a predetermined distance, the weight moves over or against the switch contacts causing them to close. The switch contacts, when closed, connect a squib to a source of electrical energy sufficient to ignite the squib.

Still other known actuatable passenger restraint systems for vehicles include an electrical transducer or accelerometer for sensing vehicle deceleration. Such systems include a monitoring or evaluation circuit connected to the output of the transducer. The transducer provides an electrical signal having a value proportional to the vehicle's deceleration. The monitoring circuit processes the transducer output signal. One typical processing technique is to integrate the transducer output signal sometimes clipped at and/or offset by predetermined values directly by use of an analog integrator. If the output of the integrator exceeds a predetermined value, thereby indicating crash violence greater than a certain amount, an electrical switch is actuated to connect electrical energy to the squib.

One example of a passenger restraint system using an electrical accelerometer is disclosed in U.S. Pat. No. 3,870,894 to Brede, et al. ("the '894 patent"). The '894 patent discloses a system which includes an accelerometer, an evaluation circuit connected to the accelerometer, and an ignition circuit or squib connected to an output of the evaluation circuit. The accelerometer includes a piezoelectric transducer that provides an electrical output signal having a value proportional to the vehicle deceleration. The evaluation circuit includes an integrator electrically coupled to the output of the accelerometer through an amplifier. The output of the integrator is an electrical signal having a value proportional to the integral of the deceleration signal. A trigger circuit is connected to the output of the integrator. When the output of the integrator reaches a predetermined value, the trigger circuit actuates a time delay circuit. The time delay circuit begins to time out a predetermined time period. After the time period is timed out, the air bag ignition circuit is energized.

It has been discovered that it is not desirable to inflate a vehicle air bag under all types of crash conditions to which the vehicle is subjected. It is not desirable, for example, to inflate the air bag during certain types of low speed crashes. Such a crash is referred to as a non-deployment crash. A non-deployment crash is one in which it is not desirable to deploy the vehicle air bag. Similarly, a deployment crash condition is one in which it is desirable to deploy the vehicle air bag. The determination as to what crash conditions fall within the definition of a non-deployment crash is dependent upon various factors related to the type of vehicle. If, for example, a small or medium size vehicle were to hit a brick wall at 30 miles per hour, such a crash condition would be a deployment crash. On the other hand, if a large vehicle traveling eight miles per hour hits a parked vehicle, such a crash would be considered a non-deployment crash that would not require deployment of the air bag to protect the vehicle passengers. The vehicle seat belts alone would be sufficient to insure passenger safety in such a crash. During such a non-deployment crash condition, a typical accelerometer would provide an output signal indicating a large deceleration is occurring. In an actuatable passenger restraint system using an integrator connected to an accelerometer wherein the integrator is the only determination device, the air bag would be inflated as soon as a sufficient speed differential occurred that would result in the integrator output exceeding a predetermined limit. If the threshold level for triggering inflation were increased so that the system did not inflate during this non-deployment event, the resulting threshold would be so high that in some types of deployment crashes (for example pole and angled crashes) the system would actuate too late to provide adequate occupant protection.

Another type of electronic control arrangement for an actuatable passenger restraint system is disclosed in U.S. Pat. No. 4,842,301 to Feldmaier ("the '301 patent").

The '301 patent discloses an air bag actuation circuit that monitors the acoustic emissions produced during crushing of a vehicle of a type having a welded, unit body structure with a pair of frame side rails extending longitudinally from the front of the vehicle to the back of the vehicle. Two acoustic vibration sensors, in accordance with the '301 patent, are secured as close as possible to the front of respective side rails. The output of each of the sensors is connected to a band pass filter with a frequency range of 200 KHz to 300 KHz so as to exclude lower frequency components. The outputs of the bandpass filters are connected to envelope detectors. The outputs of the envelope detectors are connected to comparators. Once the level of the acoustic vibrations in the pass band frequency exceeds a value set by the comparator reference, the air bag is actuated. Thus the '301 patent discloses the use of specific frequency content of the crash as well as its overall amount and timing (envelope matching) but relies not on acceleration but on sound transmitted through the structure.

SUMMARY OF THE INVENTION

The present invention relates to a method and apparatus for providing a passenger restraint actuation signal for use in controlling an actuatable passenger restraint system. The passenger restraint system actuation signal is provided, in accordance with the present invention, only upon a detection of a sufficiently violent crash condition, i.e., one that requires actuation of the passenger restraint system for protection of the vehicle passengers. In accordance with the invention, the violence of a crash condition is measured by determining the energy of the crash and comparing the measured energy against a predetermined limit. If the measured crash energy exceeds the predetermined limit, the passenger restraint actuation signal is generated.

In accordance with one embodiment of the present invention, the energy of the crash is measured by determining the root mean square of a time varying accelerometer signal. Specifically, an apparatus is provided for controlling actuation of a vehicle air bag restraint system comprising accelerometer means for sensing vehicle deceleration and for providing an electric signal having a value functionally related to the sensed deceleration. Means are provided for converting the signal provided by the accelerometer into its root mean square ("RMS") value. Means are provided for comparing the value of the converted signal against a predetermined value, the predetermined value being indicative of a vehicle deceleration of a predetermined magnitude. The apparatus of the present invention further includes means for actuating the air bag restraint system when the comparing means indicates the vehicle is being decelerated at a value greater than the value represented by the predetermined value.

The converting means, in accordance with one embodiment, includes first heater means connected to the signal provided by the accelerometer means. The first heater means radiates heat with a value functionally related to the value of the electric signal from the accelerometer means.

In accordance with another embodiment of the present invention, a method for controlling actuation of a vehicle air bag restraint system is provided by determining the energy of a vehicle crash through the root mean square of the accelerometer signal. The method comprises the steps of sensing vehicle deceleration and providing an electric signal having a value that is functionally related to the sensed deceleration, converting the electric signal provided that is indicative of the sensed vehicle deceleration into an RMS value, comparing the value of the converted signal against a predetermined value, said predetermined value being indicative of a deceleration of a predetermined magnitude, and actuating the air bag restraint system when said step of comparing indicates that the vehicle deceleration is greater than the deceleration value represented by the predetermined value.

An apparatus in accordance with another embodiment of the present invention, provides a passenger restraint actuation signal for use in an actuatable passenger restraint system in a vehicle, the apparatus comprising sensing means for providing a time varying electric signal proportional to the vehicle deceleration. The apparatus also includes means for determining from said time varying electric signal at least one kinetic energy value dissipated in the vehicle body as a result of a crash condition and means for determining a vehicle velocity value from the time varying electric signal from said sensing means during a crash condition. Means are provided for comparing the determined at least one kinetic energy value and the vehicle velocity value against associated limits. The apparatus further includes means to provide the passenger restraint actuation signal when the comparing means indicates that at least one of said at least one kinetic crash energy value and the velocity value is greater than or equal to their associated limits.

An apparatus in accordance with another embodiment of the present invention, provides a passenger restraint actuation signal for use in an actuatable passenger restraint system in a vehicle, the apparatus comprising sensing means for providing a time varying electric signal proportional to the vehicle deceleration. The apparatus also includes means for determining from said time varying electric signal a first kinetic energy value functionally related to the total kinetic energy of the crash dissipated in the vehicle body. The apparatus also includes means for determining at least one kinetic energy value functionally related to the kinetic energy of the crash dissipated in the vehicle body but eliminating from said at least one kinetic energy value the energy content at one or more predetermined frequencies, and means for determining a vehicle velocity value from the time varying electric signal from said sensing means. Means are provided for comparing the determined first kinetic energy value, the determined at least one kinetic energy value, and the vehicle velocity value against associated limits. The apparatus further includes means to provide the passenger restraint actuation signal when the comparing means indicates that each of the first kinetic energy, at least one crash energy value, and the velocity value is greater than or equal to their associated limits.

The principle of another method in accordance with the present invention is that of using the measures of energy in the crash to determine its degree of violence For any such measure of the crash energy other than the total energy, there is associated with its definition one or more frequency bands which are excluded from the calculation of its value. Recognize that the energy in a signal is mathematically identical to the integral of the power spectral density of the signal. The signal from the accelerometer can be filtered to remove frequency bands relevant to a given measure before computing the power spectral density. Alternatively, a digital process may be used to accomplish the same thing after its computation.

Although the method of the present invention can be made to discriminate between degrees of crash violence by removal of certain frequencies from the partial energy measures, it has been found that the method works best when the frequency removed from the energy measure is the band at zero Hertz.

Furthermore, discrimination for certain vehicles is possible using, for instance, only the total energy. Finally, the addition of the velocity measure in combination with the energy measures is useful for only some vehicle types. Thus, the method in accordance with the present invention, is a general one in which the threshold parameters can be set "off scale" to eliminate from consideration those elements of the method unnecessary for discrimination for an "easy" vehicle type, i.e., one that permits discrimination between degrees of vehicle crash from one measure of crash energy.

Because the method has been found to work particularly well using, as a part, the energy measure with the zero Hertz component removed, a mathematically analogous computation of the signal energy can be made without resorting to frequency domain analysis. This is because the filter for zero Hertz exists in the time domain as the subtraction of the mean from the signal. As will be appreciated by those skilled in the art, Parsival's Theorem permits a direct determination of a signal's energy in the time domain without need to transform into the frequency domain.

When performing the calculations in the time domain, the signal would normally be squared, integrated and have the square root taken. The preferred embodiment disclosed uses absolute values rather than the square-square root process because it is computationally easier. It produces not mathematically equivalent, but usefully analogous curves of similar shape, i.e., provides a signal having a value functionally related to the energy of the crash.

Note that no matter what the choice of energy measures, or the usefulness of any one for a particular vehicle type, the method, in accordance with the present invention, examines how these measures build as a function of time. The computations of energy are not carried out over the entire time of the crash; rather they are computed on short, overlapping segments of the crash history so that it is possible to track how they build with time. The exact length of the time slices is unimportant, but the use of something near 12 ms has been found to be best. The exact frequency of recomputation is unimportant, but the use of something near 2 ms has been found to be best. In computing the energy measures the recently computed values for each time slice are combined with weighting functions. The exact weights are unimportant, but those described below which tend to weight the most recent computations more heavily are known to provide faster response.

The velocity measure is added because with some vehicle types, it helps eliminate unwanted firing on rough road events.

In summary, the method, in accordance with another embodiment of the present invention, is a general one wherein not only specific vehicle parameters are to be chosen, but specific calculational sequences, recalculation frequency, integration intervals and weighting functions have been chosen because they have been found to work best—hence the preferred embodiment.

A method for providing a passenger restraint actuation signal for use in an actuatable passenger restraint system in a vehicle comprises the steps of providing a time varying electric signal proportional to vehicle deceleration, determining at least one energy value functionally related to the kinetic energy of the crash dissipated in the vehicle body, determining a vehicle velocity value from the time varying electric signal, comparing the determined at least one kinetic energy value, and the vehicle velocity value against associated limits, and providing the passenger restraint actuation signal when said step of comparing indicates that at least one of the at least one kinetic energy value, and the velocity value is greater than or equal to their associated limits.

A method for providing a passenger restraint actuation signal for use in an actuatable passenger restraint system in a vehicle comprises the steps of providing a time varying electric signal proportional to vehicle deceleration, determining a first kinetic energy value functionally related to the total kinetic energy of the crash dissipated in the vehicle body, determining at least one energy value functionally related to the kinetic energy of the crash dissipated in the vehicle body but eliminating from each kinetic energy value the energy content at one or more specific frequencies, determining a vehicle velocity value from the time varying electric signal, comparing the determined first kinetic energy value, the determined at least one kinetic energy value, and the vehicle velocity value against associated limits, and providing the passenger restraint actuation signal when said step of comparing indicates that each of the first kinetic energy value, the at least one kinetic energy value, and the velocity value is greater than or equal to their associated limits.

BRIEF DESCRIPTION OF THE DRAWINGS

Other features and advantages of the present invention will become apparent to those skilled in the art to which the present invention relates from a reading of the following detailed description of a preferred embodiment with reference to the accompanying drawings, in which:

FIG. 3 is a schematic diagram of the transducer circuit shown in FIG. 1;

FIG. 4 is a graphical representation of certain voltage values present in the control arrangement shown in FIG. 1;

FIG. 5 is a schematic diagram of a portion of the common-mode rejection circuit shown in FIG. 1;

FIG. 6 is a schematic diagram of a portion of the common-mode circuit shown in FIG. 1;

FIG. 7 is a schematic diagram of a portion of the firing circuit shown in FIG. 1;

DESCRIPTION OF A PREFERRED EMBODIMENT

Figure 1:
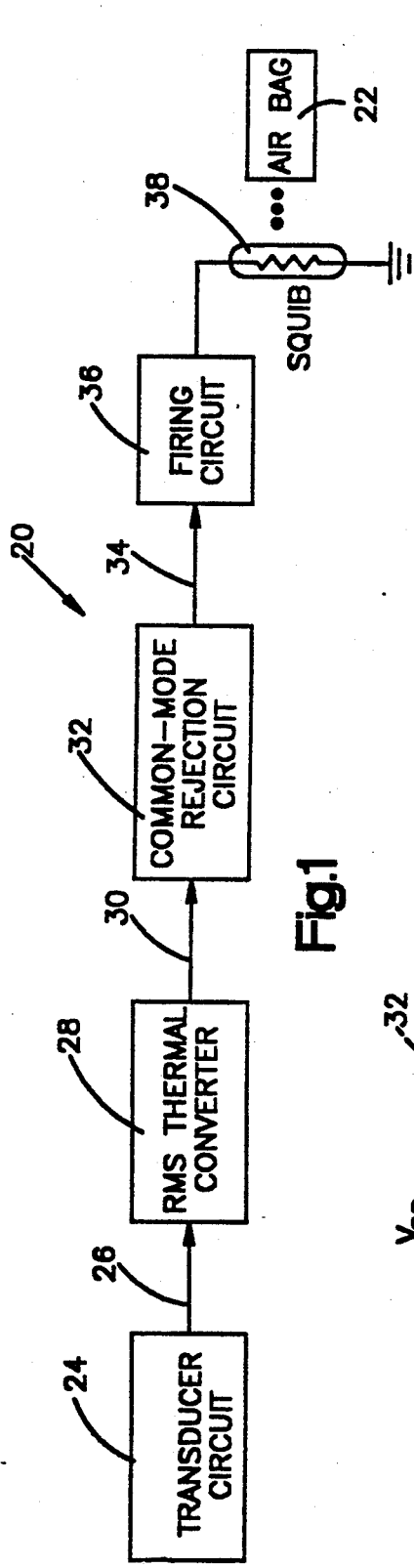
FIG. 1 is a schematic block diagram of control arrangement made in accordance with one embodiment the present invention.

Referring to FIG. 1, an apparatus 20 made in accordance with one embodiment of the present invention is shown for controlling actuation of an air bag 22 in an actuatable passenger restraint system of a vehicle. The apparatus 20 includes a transducer circuit 24 that provides an output signal 26 having a value indicative of the energy of a crash condition to which the vehicle is subjected. The output 26 of the transducer is connected to an RMS thermal converter 28. The RMS thermal converter 28 provides an output signal 30 having an RMS value functionally related to the value of the signal 26. The RMS value of the signal 26 is a value functionally related to the energy of the crash.

The output signal 30 is connected to a common-mode rejection circuit 32. The common-mode rejection circuit 32 monitors the output signal 30 from the RMS thermal converter 28 and provides an output signal 34 having a converted RMS value which is functionally related t the energy of the output signal 26 of the transducer 24 without variance due to common-mode voltage errors. The output 34 is connected to a firing circuit 36. The firing circuit 36 controls the gain of the converter circuit, including the RMS thermal converter 30 and the common-mode rejection circuit, and compares the converted RMS value, i.e., a value functionally related to the crash energy, against a predetermined value.

The predetermined value is indicative of a maximum crash energy value, above which it is necessary to fire or actuate the air bag for protection of the vehicle occupants. The firing circuit 36 is connected to a squib 38 associated with the air bag 22. When the firing circuit 36 is to fire the squib 38, the squib 38 is connected to a source of electrical energy so as to provide the squib with a predetermined minimum electrical current for a predetermined minimum time period so as to insure proper operation of the squib.

Referring to FIG. 3, the transducer circuit 24 includes a mass 40 suspended by a cantilever support arrangement (not shown). Four variable resistors 42, such as piezo-resistors, are mounted to the cantilever support arrangement. The resistors 40 are electrically connected in a Wheatstone bridge configuration. When the mass 40 of the accelerometer moves relative to its mounting, as would occur when the vehicle suddenly decelerates, the resistances of the resistors 42 change and thereby provide an indication of the value of the vehicle deceleration which is, in turn, indicative of the crash energy. Such a transducer or accelerometer is available commercially from ICSensors, 1701 McCarthy Blvd., Milpitas, Calif. 95035 under Model No. 3021.

The bridge resistors 42 are connected to an amplifier circuit 44 which provides the output signal 26 having a value indicative of the crash energy of the vehicle. FIG. 4 shows a graph of the transducer output signal 26 during a vehicle crash. The rough appearance to the graph of the output signal 26 is due to the vibrations of the mass 40 during the vehicle deceleration.

Figure 2:
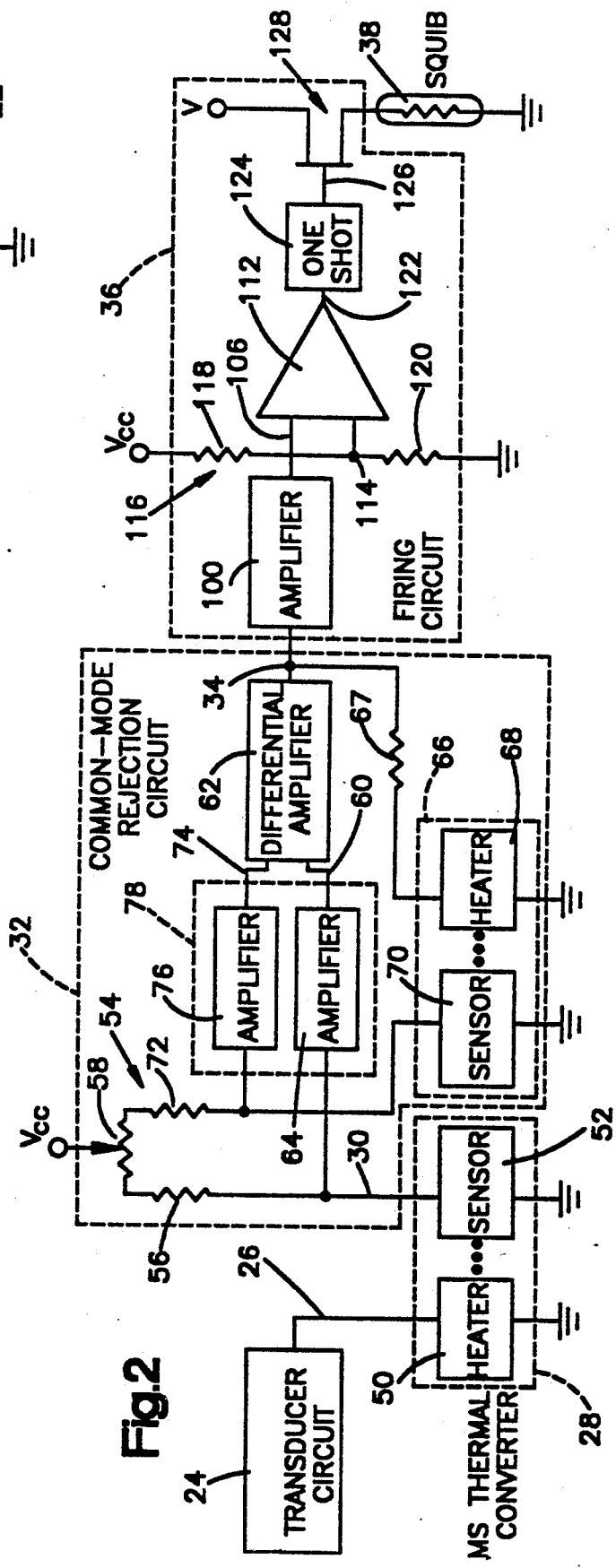
FIG. 2 is a schematic diagram of the control arrangement shown in FIG. 1 in more detail.

The output signal 26 is connected to the RMS thermal converter 28, as shown in FIG. 2. The RMS thermal converter 28 includes a heater element 50 connected to the output signal 26 of the transducer 24 and to electrical ground. The heater element 50, which may be a resistor, provides heat when electrical current is passed through it. As is well known in the art, when an electric signal is passed through a load, the heat generated in the load is functionally related to the RMS value of the signal. The RMS value of the signal 26 is functionally related to the energy of the crash. Therefore, the temperature of the heater element 50 is functionally related to the RMS value of the output signal 26. A straight forward way to convert the value of the signal 26 into an RMS value is to measure the temperature of the heater element 50. Such a process is known in the art as thermal RMS conversion.

The converter 28 further includes a temperature sensor 52 associated with and in thermal communication with the heater element 50. The sensor 52 has a resistance value that varies as a function of its temperature. Therefore, as the temperature of the heater element 50 varies, the resistance value of the sensor 52 varies.

The sensor 52 is connected to electrical ground and to a resistor balance circuit 54 which includes a resistor 56 connected to a reference voltage Vcc through a potentiometer 58. The junction between resistor 56 and sensor 52 is connected to one input 60 of a differential amplifier 62 through an amplifier 64. The output 34 of the differential amplifier 62 is connected to a thermal heater/sensor arrangement 66 through a series resistor 67. The heater/sensor arrangement is preferably identical in structure and operation as the RMS thermal converter 28.

In particular, the output 34 of the differential amplifier 62 is connected to a heater element 68 through the series resistor 67. The heater element 68 is also connected to electrical ground. A sensor 70, associated with and thermally coupled to the heater element 68, is connected to electrical ground and to the reference voltage Vcc through a resistor 72 and potentiometer 58. The junction of resistor 72 and sensor 70 is operatively connected to a second input 74 of differential amplifier 62 through an amplifier 76.

As represented in FIG. 5, the amplifiers 64, 76 form an instrumentation amplifier 78 that amplifies the voltage difference present across sensor 52 and sensor 70. The differential amplifier 62, as shown in FIG. 6, includes an operational amplifier ("op amp") 80 having a non-inverting input 60 and an inverting input 74. The output of amplifier 64 is connected to the non-inverting input 60. The output of amplifier 76 is connected to the inverting input 74. A capacitor 82 and a resistor 84 are connected between the non-inverting input 60 of the op amp 80 and electrical ground so as to provide a low pass filter.

The output 86 of the op amp 80 is connected to the base of a NPN transistor 88 through a resistor 90. The collector of the transistor 88 is connected to a reference voltage Vcc. The emitter of transistor 88 is connected to the firing circuit 36 and connected to the heater 68 through the series resistor 67 of the thermal sensor arrangement 66. The emitter of transistor 88 is further connected back to the inverting input 74 through the parallel combination of capacitor 92 and resistor 94. The capacitor 92 and the resistor 94 function as a low pass filter. This arrangement provides a source of current for the heater 68.

The output 34 of the differential amplifier 62 is connected to an amplifier 100 of the firing circuit 36, as shown in FIG. 2. The amplifier 100, as shown in FIG. 7, includes an operational amplifier 102 having its non-inverting input connected to the output 34 of the differential amplifier 62 through a potentiometer 104. The output 106 of the op amp 102 is fed back to its inverting input through a resistor network including resistors 108, 110. The amplifier 100 is used to control the loop gain of the RMS thermal converter. Preferably, potentiometer 104 is adjusted so that the gain of the signal processing circuitry, including the RMS thermal converter 28, the common-mode rejection circuit 32, and the amplifier 100, is equal to one.

The output 106 of the op amp 102 is connected to one input of a comparator 112. The other input of the comparator 112 is connected to a predetermined reference voltage 114 which is derived from the reference voltage Vcc through the resistor divider network 116. The predetermined reference voltage is established through a resistor dividing network connected between the reference voltage Vcc and electrical ground. The network 116 includes resistors 118, 120. The output 122 of the comparator 112 is connected to an edge triggered one-shot 124. The one-shot can be selected to trigger off the rising edge or the falling edge of the output signal 122. Whether the one-shot 124 is triggered off the rising or falling edge will determine the connections at the two inputs of the comparator 112. For example, if the one-shot 124 is a rising edge trigger type, the output 106 of the amplifier 100 would be connected to non-inverting input of the comparator 112 and the reference voltage 114 would be connected to the inverting input.

The output 126 of the one-shot 124 is connected to a control input of an electrically controlled switch 128 which can be one of several type of switches commercially available. One terminal of the switch 128 is connected to a supply voltage V and the other terminal of the switch is connected to the squib 38. The other terminal of the squib is connected to electrical ground. The one-shot is arranged such that when triggered, it actuates the switch 128 for a sufficient time duration so as to insure that the squib has fired. The voltage source V must be of sufficient magnitude to supply sufficient electrical current to the squib when the switch 128 is actuated to insure that the squib fires.

In operation, the accelerometer monitors the vehicle deceleration, which is functionally related to the crash energy. When the vehicle is subject to a large deceleration, such as three times the force of gravity or greater, the deceleration transducer circuit 24 provides an electric signal having a value functionally related to the energy of the crash. Referring to FIG. 4, a graphical representation of an output of the transducer circuit during a violent crash condition is depicted. The output 26 causes the heater element 50 to heat. The temperature of the heater element 50 is functionally related to the RMS value of the output 26 which is, in turn, functionally related to the crash energy. The sensor 52 monitors the temperature of the heater element 50, its resistance changing as a function of the amount of heat sensed, and, in turn, the RMS value of the of the output signal 26.

When the resistance of the sensor 52 first changes, an imbalance is created in the circuit 54 which includes resistors 56, 58, 72, and sensors 52, 70. The imbalance in the circuit 54 results in the differential amplifier 62 increasing its output voltage. As the output 34 of the differential amplifier 62 increases, the heater element 68 provides an increased heat output which is sensed by its associated sensor 70. Once the heater element 68 provides a sufficient amount of heat to cause the voltage drop across the sensor 70 to equal the voltage drop across the sensor 52, the output of the differential amplifier 62 will hold at the then present value.

Referring to FIG. 4, the output 34 of the differential amplifier 62 is shown responsive to the transducer signal 26. The output 34 is functionally related to the crash energy. The output 34 has a finite phase lag relative to the rising edge of the input signal. This phase lag is due to the response time of the differential amplifier 62 and to the reaction time of heater/sensor combination 68, 70. A heater/sensor combination such as 68, 70 has a fixed reaction time, i.e. that time delay from when heat is provided by the heater element to when that provided heat is sensed by the sensor. This fixed time delay is referred to as the heater/sensor thermal time constant. Because thermal sensor arrangements are commercially available in a monolithic design or can be manufactured in a monolithic design, the thermal time constant is sufficiently small to make their use in a crash sensor possible.

The thermal sensors 28 and 66 preferably include the same type of components. It should be appreciated that ambient temperature variations on the thermal sensor 28 which may induce a common-mode voltage error will equally affect the thermal sensor 66. The feedback arrangement as shown and described cancels the effects of ambient temperature variations. Also, the potentiometer 58 permits an initial zero balancing of the circuit so as to adjust for component variances prior to use.

The output 34 of the differential amplifier 62 is monitored by the firing circuit 36. The predetermined reference voltage 114 controls when the squib will be fired and when, in turn, the air bag 22 will be actuated. When the RMS value of the deceleration signal reaches a predetermined level, which is functionally related to the value of the predetermined reference voltage 114, the air bag 22 is actuated The RMS value being at a certain level is indicative of a certain crash energy value. The apparatus 20 made in accordance with the present invention permits the distinction between a vehicle "soft crash" and a "hard crash" to better control the actuation of the air bag. During a "soft crash" of the vehicle, the crash energy value is lower than during a "hard crash." By properly selecting the reference voltage 114 taking into account many of the vehicle parameters, one can control when the air bag will be actuated so as to protect the vehicle occupants better and not to actuate the air bag needlessly for "soft crashes" or inflate the air bag sooner than it should be inflated. When a "hard crash" occurs, the air bag will be actuated within a very short time period. The only time delay encountered results from the system phase lag. If the vehicle is slowly decelerating at value that would be considered a "soft crash" but then increases its deceleration value to that of a "hard crash," the air bag will not be actuated during the "soft crash" when it is not needed but will be actuated when the "hard crash" criteria is reached.

Also, the thermal sensor arrangement, because of its inherent thermal lag or thermal time constant, acts to filter out certain occurrences for which it is not desirable to actuate the air bag. For example, if the vehicle was subject to a high frequency hammer blow, heat would be generated for only a short period of time which would be insufficient to raise the sensor voltage enough to result in actuation the air bag.

The apparatus 20 in accordance with the present invention further provides a short-term memory feature in which the occurrence of a crash energy large enough to produce an output signal from the transducer 24 but not large enough to result in actuation of the air bag is "remembered" so that if a second large crash energy occurs within a certain time period, the second crash energy effect is added to the first crash energy effect so as to result in a quicker actuation of the air bag. Referring to FIG. 4, the output 34 of the common-mode rejection circuit 32 increases in response to the transducer output signal 26. Once the transducer signal 26 decreases because of a decrease in the vehicle deceleration and crash energy, the output 34 begins to decrease from its highest level at a relatively slow rate as compared to the decrease in the deceleration signal.

This slow decrease in the output signal 34 results from the presence of resistor 67 connected in series with the heater 68. The transistor 88 functions as a single ended current source providing power to the heater 68. The voltage remains high at output 34 with a part of the voltage drop occurring across resistor 67. The feedback arrangement is such that the power supplied to the heater 68 must equal the power supplied to the heater 50 by the transducer 24. The resistor 67 effects a positive power lag because some of the power provided by the single ended current source is effectively lost through resistor 67. Therefore, the voltage at 34 decreases slowly until power equalization occurs, i.e., the power provided to heater 50 is equal to the power provided to heater 68. If the vehicle should be subjected to a violent crash condition while the voltage 34 is still relatively high, the output 34 will begin to increase from its then present level. It should be appreciated that this increases the response time of the apparatus 20 because the output 34 "remembered" the occurrence of the previous large deceleration. If a second violent crash condition does not occur by the time the output drops to its zero level, the second violent crash condition was probably not a result of the same event as the first violent crash condition. Under such a condition, the second crash condition would be processed as described above.

It should be appreciated that this function of retaining the converted RMS value of the transducer output signal can also be accomplished by using heater/sensor arrangements for 28, 66 that have different thermal time constants. In particular, this function can be retained by using a heater/sensor arrangement 66 that has a longer thermal time constant than the heater/sensor arrangement 28. The effect of resistor 67 in the above-described embodiment is to increase the thermal time constant of the heater/sensor arrangement 66. The feedback arrangement balances the sensed power of the two heaters 50, 68. If the thermal time constant of the heater/sensor 66 is longer than that of the heater/sensor 28, the output of 34 will be begin to decay at a relatively slow rate from highest converted value. The decay time is controlled by the amount of time needed for the power to balance.

The thermal sensor arrangements 28, 66 can be made with discrete components or can be manufactured on a single integrated circuit package. There is at least one commercially available thermal sensor arrangement manufactured by Linear Technology Corporation of 1630 McCarthy Blvd., Milpitas, Calif. 95035-7487 under part No. LT1088.

Figure 8:
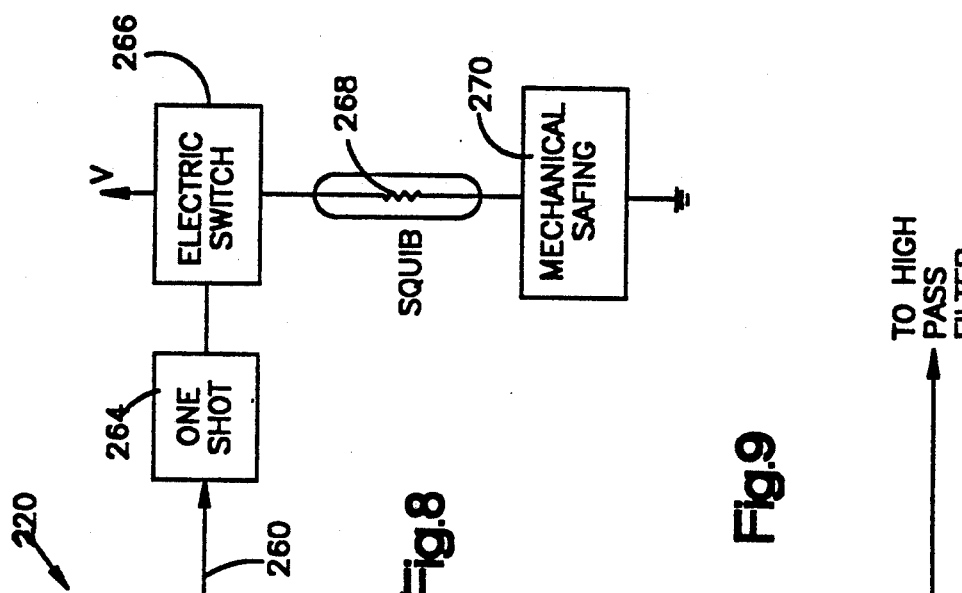
FIG. 8 is a schematic block diagram showing a passenger restraint control system made in accordance with another embodiment of the present invention.

Referring to FIG. 8, an apparatus 220 is shown for providing an actuation signal for controlling the actuation of an air bag restraint system in accordance with another embodiment of the present invention. An accelerometer assembly 222 includes an accelerometer 224 electrically connected to an amplifier 226. The accelerometer 224 is identical to that shown in FIG. 1. The output 228 of the amplifier 226 is an oscillating or time varying electrical signal. It has been discovered that for each of various types of vehicle crash conditions, the accelerometer output has particular, identifiable, computable electrical signal characteristics indicative of the type of crash condition.

Figure 9:
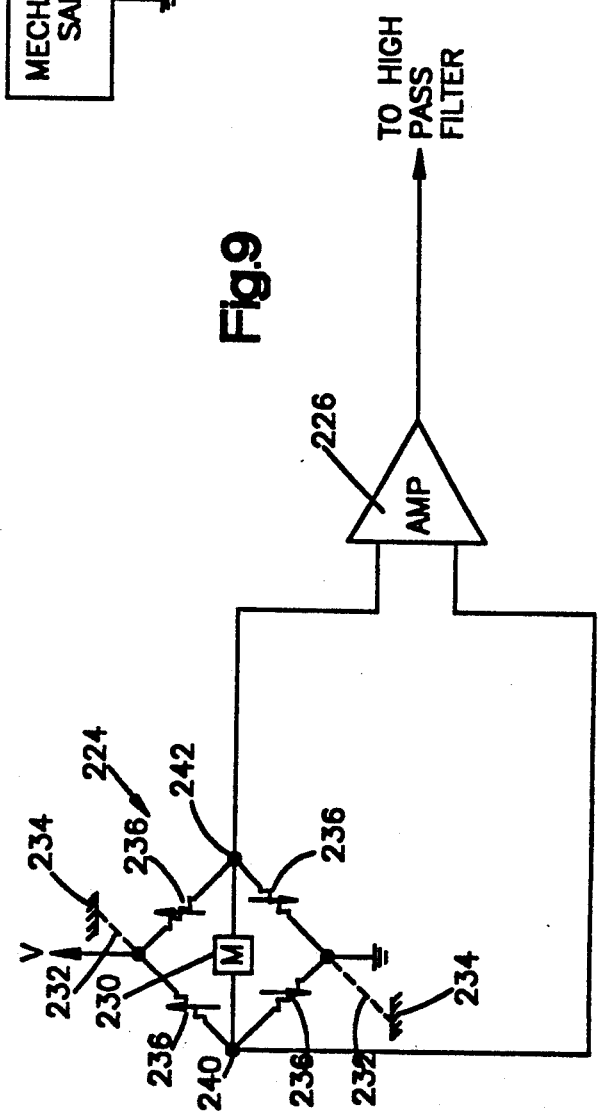
FIG. 9 is a schematic diagram of the accelerometer assembly shown in FIG. 8.

Referring to FIG. 9, the accelerometer 224 includes a mass 230 suspended by a cantilever support arrangement 232 secured to a housing 234. The housing is securable to the vehicle directly or indirectly as a part of the entire apparatus. Four variable resistors 236 are mounted to the cantilever support arrangement. The resistors 236 are electrically connected in a Wheatstone bridge configuration between electrical ground and a source of electrical energy V. When the mass 230 of the accelerometer moves relative to its housing 234, as happens during a vehicle crash, the resistance values of the resistors 236 change. .Because of the Wheatstone bridge configuration, a voltage variation occurs across terminals 240, 242 which is indicative of the movement of the mass 230. The bridge resistors 236 are connected to amplifier 226 which provides the output signal 228 having a value proportional to the movement of the mass 230.

A "deployment crash" is one in which it is desirable to actuate a passenger restraint system. A "non-deployment crash" is one in which it is not desirable to actuate the passenger restraint system. In an airbag system, the words "deployment crash" and "non-deployment crash" refer to crashes in which the air bag is either deployed or not deployed, respectively. The words "deployment crash" and "non-deployment crash" are also meant to include crashes in which an electrical control signal for any type of actuatable passenger restraint system, including a lockable seat belt system, is either outputted or not outputted respectively.

It has been discovered that if two vehicles of the same type or class are subjected to both deployment and non-deployment crash conditions, substantially similar electrical signal characteristics are present in the output signal of the accelerometer. Also, different types of vehicles subjected to the same type of crash may exhibit different electrical signal characteristics in the accelerometer output signal. For example, if a particular make or model of vehicle is crashed into a pole at 30 MPH, certain electrical signal characteristics are present in the accelerometer output signal. If a different make and model vehicle is also crashed into a pole at 30 MPH, different electrical signal characteristics may be present in the accelerometer output signal even though the accelerometers are mounted in equivalent areas in both of the two different types of vehicles. For purposes of describing a preferred embodiment of the invention, electrical signal characteristics exhibited by one make and model of vehicle are discussed for different types of vehicle crash conditions.

Figure 10:
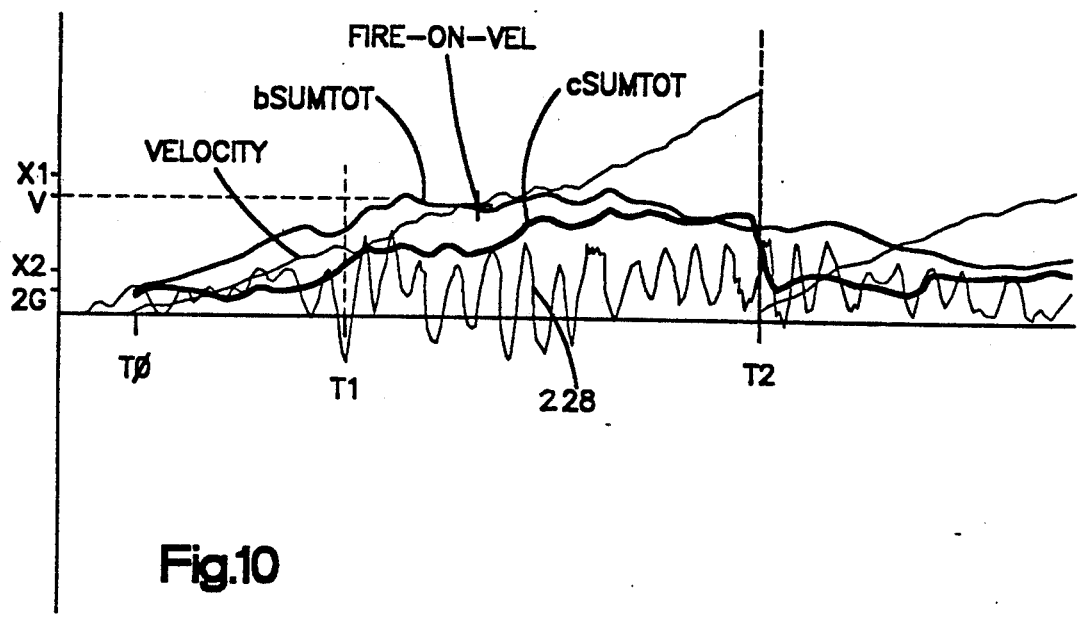
FIG. 10 is a graphical representation of the output of the accelerometer assembly and computation of the energy and velocity measures during a non-deployment crash condition in accordance with the embodiment shown in FIG. 8.
Figure 11:
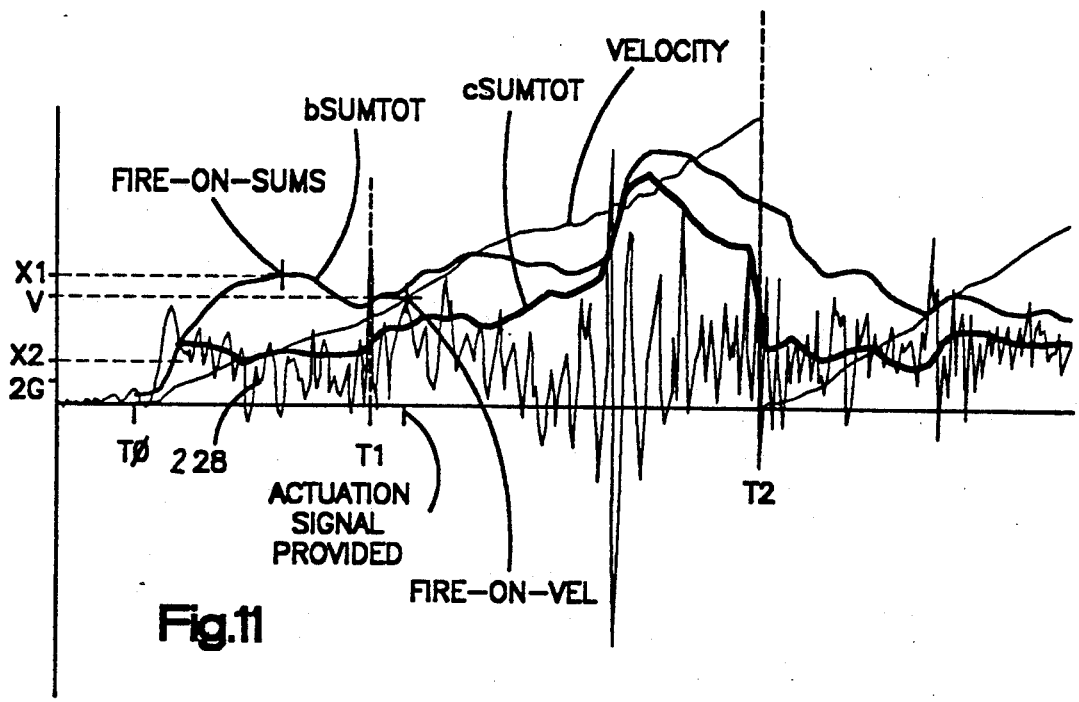
FIG. 11 is a graphical representation of the output of the accelerometer assembly and computation of the energy and velocity measures during a deployment crash condition in accordance with the embodiment shown in FIG. 8.

Referring to FIG. 10, the output 228 of the accelerometer assembly 222 is graphically depicted during a non-deployment crash condition with amplitude on the y-axis and time on the x-axis. The rough appearance to the graph of the output signal 228 is due to the vibrations of the mass 230 during the vehicle crash. Referring to FIG. 11, the output 228 of the accelerometer assembly 222 is graphically depicted during a deployment crash condition with amplitude on the y-axis and time on the x-axis.

Referring to FIG. 8, the output 228 of the accelerometer assembly 222 is connected to a high-pass, 2–5 Hz filter 250 which filters out low frequency components from the signal 228. The purpose of the filter is to eliminate the effects of zero drift inherent in the accelerometer assembly. Its frequency is low enough, however, to pass substantially all of the relevant crash information. The output of the filter 250 is connected to an analog-to-digital ("A/D") converter 252 of a type well known in the art. The A/D converter 252 is connected to a microcomputer 254 which controls the A/D converter 252. The control of an A/D converter by a microcomputer is well known in the art and is, therefore, not described herein in detail. Also, microcomputers are referred to in the art as microcontrollers and are commercially available from several manufacturers in single chip packages.

The output of the A/D converter 252 is connected to a random access memory ("RAM") 256. The microcomputer 254 is also connected to the RAM 256 and controls the locations within the RAM 256 where the data from the A/D converter 252 is stored. This is accomplished by the microcomputer addressing locations of the RAM 256 as the data is output from the A/D converter 252.

In one embodiment of the present invention, the RAM 256 is divided into a plurality of groups or data sets of 120 data points. Each data point of the 120 within a data set is indicative of the analog value of the accelerometer assembly signal 228 then present at its associated sample or measurement time. Preferably, the sample time of the A/D converter 252 is 10 kHz Therefore, the A/D converter 252 provides an output signal indicative of a monitored voltage value every 0.1 msec. Each digital voltage value from the A/D converter 252 can be stored in separately addressable locations in RAM 256. Each address location of RAM 256 includes eight bits of information to form one word indicative of an associated measured voltage value.

Data points for crash recording purposes only (not for algorithm calculations) are stored sequentially as received in RAM (either internal to the microcomputer 254 or externally as shown in RAM 256). Data is written over (to reduce the amount of RAM required) when no longer necessary for retention for crash recording purposes.

According to one embodiment of the invention, with the same rate of the A/D converter at 10 kHz, every 2 ms or 20 data points, certain intermediate calculations as described below are made using these data points. These calculational results are stored in RAM. Also, every 2 ms, the intermediate calculations are combined with previous results stored in RAM using predetermined weights as described below to produce the overall measures of energy and velocity. These overall measures are compared against their threshold values to determine if firing should take place.

Thus, the microcomputer 254 (a) processes the data from the A/D converter 252 on a real-time basis using time domain digital signal processing techniques and (b) controls outputting of the passenger restraint actuation signal 260 in response to the processed data.

The output signal 260 from microcomputer 254 is connected to a one-shot 264. When the microcomputer 254 determines that the vehicle is in a deployment crash condition, a signal 260 changes states so as to trigger the one-shot 264. The output of the one-shot 264 is connected to an electrical, normally open switch 266. The electrical switch can be any of several type known in the art including a relay, an FET, etc.

The switch 266 is connected in series with a squib 268 and a mechanical inertia switch 270 between a source of electrical energy V and electrical ground. Mechanical inertia switches are well known in the art. One type of mechanical switch contemplated for use with the present invention is known as a "Rolamite" switch. Such a switch is disclosed in U.S. Pat. No. 3,688,063 to Bell and U.S. Pat. No. 3,812,726 to Bell. Upon being triggered, the one-shot outputs an electric pulse that closes the switch 266 for a time duration sufficient to insure that the squib is ignited Ignition of the squib 268 requires that both the electric switch 266 and the mechanical switch 270 be closed.

Figure 12:
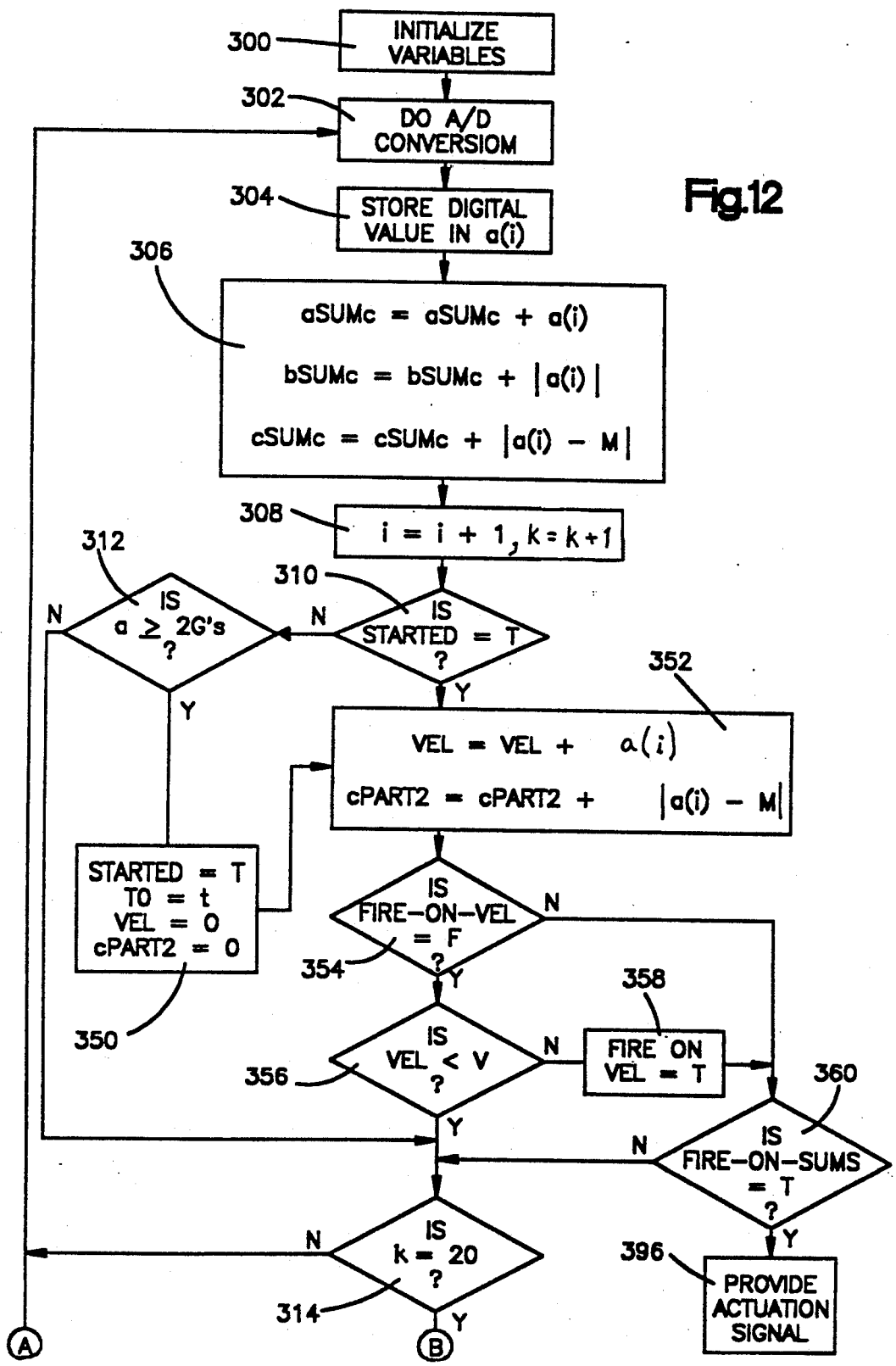
FIGS. 12 and 13 are flow charts depicting the control process for the microcomputer shown in FIG. 8.
Figure 13:
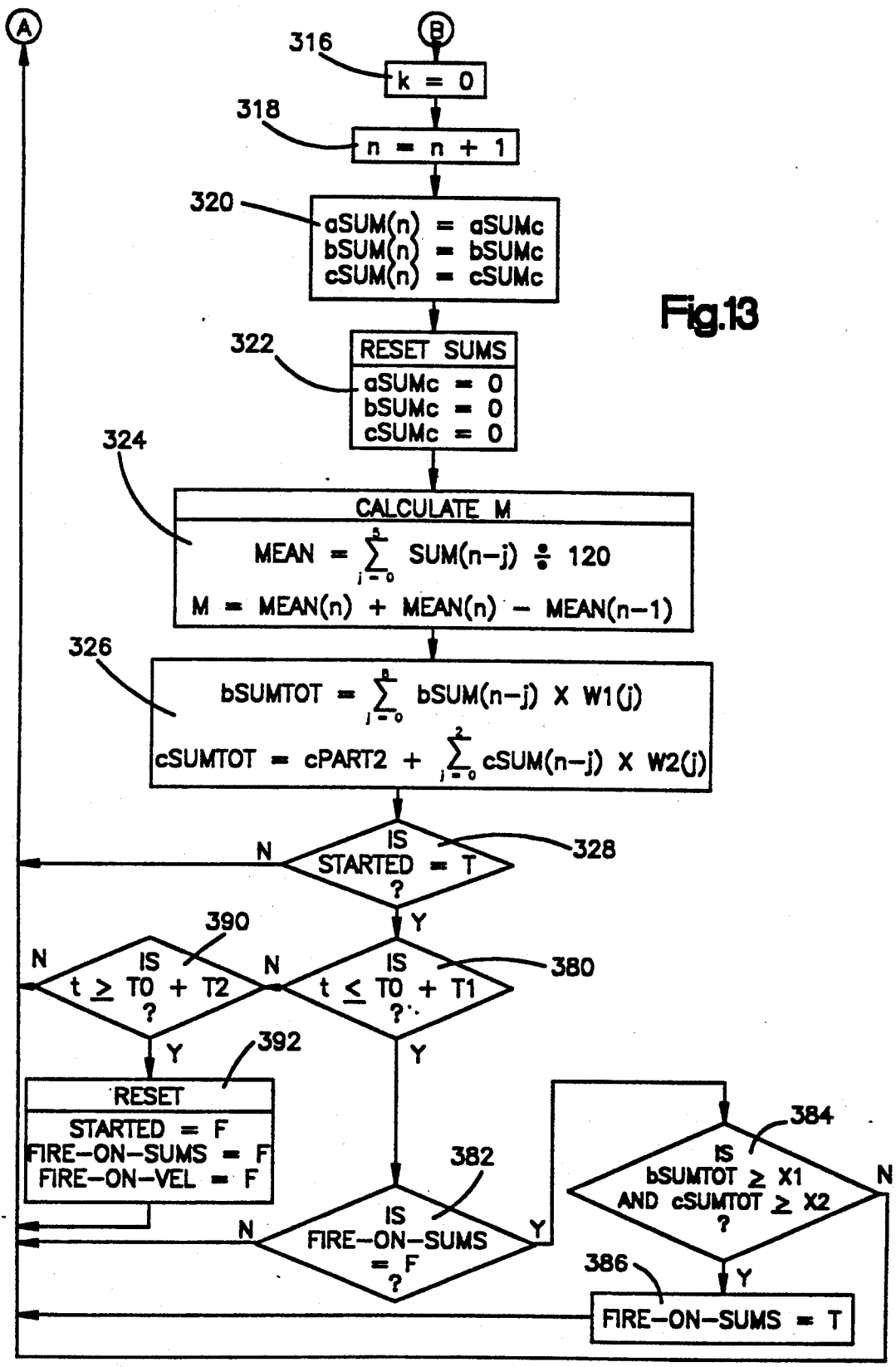

FIGS. 12 and 13 illustrate the control process performed by the microcomputer 254, in accordance with the present invention The control process measures the accelerometer output signal 228 and performs three separate time domain algorithms on the measured values The results of the three algorithms are compared against associated limits within predetermined associated time periods. If the results of all three algorithms equal or exceed their associated limits within their associated time periods, the passenger restraint system actuation signal 260 is generated In accordance with the control process of the present invention, step 300 initializes all parameters used in the remainder of the control process. The three algorithms used in the time domain data processing of the present invention are used to determine if the actuation signal should be provided only after the signal 228 from the accelerometer indicates that the vehicle is subjected to a braking force greater than or equal to 2 G's (i.e., twice the force of gravity). The time at which the braking force is equal to 2 G's is designated as time T0. The algorithms process data over two time periods designated T1 and T2, both beginning at time T0. If the time periods have not begun, i.e., the accelerometer signal does not indicate that the braking force is equal to or greater than 2 G's, a flag, designated as "STARTED," is set equal to "F" for false. When the time periods have begun, the STARTED flag is set equal to "T" for true. At step 300, STARTED is set equal to F. Other parameters, the significance of which will be appreciated as the flow charts are further discussed, include:

$$
\begin{aligned}
M &= 0, \\
k &= 0, \\
i &= 0, \\
aSUMc &= 0, \\
bSUMc &= 0, \\
cSUMc &= 0, \\
cPART2 &= 0, \\
Vel. &= 0, \\
n &= 0, \\
FIRE\text{-}ON\text{-}VEL &= F, \text{ and} \\
FIRE\text{-}ON\text{-}SUMS &= F.
\end{aligned}
$$

The process proceeds to step 302 in which the A/D converter 252 converts the analog voltage value of the output signal 228 from the accelerometer assembly 222 into a digital quantity The digital quantity is a value designated a(i). If the A/D converter 252 is an eight bit converter, it outputs an eight bit binary code indicative of the analog voltage value of the then sampled input signal. Assuming the sample rate of the A/D converter is 10 KHz, a new digital quantity is output from the A/D converter 252 every 0.1 msec. The term a(1) represents the first digital value, the term a(2) represents the second digital value, and so on. As will be seen by the process described below, data is processed in groups of 20 A/D conversions. The most recent group of 20 measurements is referred to as the current measurement window Three sums, aSUMc, bSUMc and cSUMc are calculated from the 20 points in the current measurement window as described below. The most recent 6 aSUMc, 9 bSUMc and 3 cSUMc are stored in RAM in FIFO (first-in-first-out) queues.

In step 304, the each converted signal is stored in the RAM 256. In step 306, the following three algorithms are performed:

$$aSUMc = aSUMc + a(i)$$

$$bSUMc = bSUMc + |a(i)|$$

$$cSUMc = cSUMc + |a(i)-M|$$

The term aSUMc represents the change in velocity of the vehicle as determined from the accelerometer signal in the current measurement window. The term bSUMc represents the total kinetic energy of the crash dissipated in the vehicle body during the current measurement window. The term cSUMc represents the dissipated kinetic energy of the crash not including the zero Hz contribution during the current measurement window.

To further explain bSUMc and cSUMc, a moving vehicle has kinetic energy. During a crash condition, the vehicle's kinetic energy is changed from its prior crash value to a subsequent value of zero. A significant portion of the kinetic energy is dissipated through deformation of the parts of the vehicle body. In the vehicle's frame of reference, portions of the vehicle body are accelerated by forces resulting from the collision. The accelerometer output 228 has electrical characteristic values functionally related to the total acceleration of the body parts. The value of the total kinetic energy dissipated by the vehicle body in a crash is equal to the integral of the square of the output of the accelerometer signal. Those skilled in the art will appreciated that the sum of the absolute values of the output of the accelerometer is functionally related to the sum of the squares of the output of the accelerometer. The two differ in magnitude but are substantially similar in shape as functions of time. Therefore, in accordance with this embodiment of the present invention, the total kinetic energy dissipated during the crash is determined by summing the absolute value of the accelerometer signal. It is contemplated, however, that one could use an algorithm that takes the sums of the square of the accelerometer output. The process of summing the absolute value simplifies the algorithm The value bSUMc is, therefore, a value functionally related to the total kinetic energy dissipated by the vehicle body during the current measurement window of the crash.

The value of cSUMc is equal to the value of the bSUMc minus the average value of the accelerometer output signal. To best understand the meaning of cSUMc, consider a rigid object being crashed into a soft object. Most of the energy is absorbed by the soft object. During such a crash, the rigid object gradually comes to a stop with no deformation of the rigid object. In such a case, the value of cSUMc approaches zero because the rigid object experiences only slowly varying deceleration: i.e. at any time the average deceleration over the last 12 ms is approximately equal to the current deceleration. Now consider when a first rigid object is crashed into a second rigid object. During such a crash, the first rigid object deforms. During the deformation of the first rigid object, the average value of the energy computed from the accelerometer output is much less than the total kinetic energy being dissipated in the vehicle body during the crash. Therefore, cSUMc is large. The value of cSUMc is a value functionally related to the kinetic energy of the crash dissipated by deformation of the vehicle body.

During a soft vehicle crash, such as an 8 mph pole crash, the value of cSUMc represents a relatively small percentage of the total kinetic energy of the crash dissipated in the vehicle body. During a hard vehicle crash, such as a 30 mph barrier, the value of cSUMc represents a larger percentage of the total kinetic energy of the crash dissipated in the vehicle body.

In the cSUMc calculation, the value M (for mean) is equal to zero as was set in the initialization step 300. After the first 20 measurements are completed, the value of M changes in a manner described below.

In step 308, the value of k is updated to equal k+1 and i is updated to i+1. In step 310, an inquiry is made as to whether STARTED is true. Since the STARTED flag was originally set to false in the initialization step 300, the determination in step 310 is negative. The control process proceeds to step 312 where a determination is made as to whether the accelerometer signal indicates a vehicle braking force greater than or equal to 2 G's is occurring. If the determination in step 312 is negative, the process proceeds to step 314 where a determination is made as to whether k is equal to 20. The value of k was originally set equal to zero in step 300 and is updated by adding 1 to it in step 308 each time the A/D converter does another measurement and performs a conversion. Therefore, step 314 will be affirmative once every 20 measurements and conversions by the A/D converter. If the determination in step 314 is negative, the process loops back to step 302 where the next measurement and conversion is performed by the A/D converter 252. After 20 measurements and conversions are completed by the A/D converter 252 and stored in the RAM 256, the determination in step 314 is affirmative.

From an affirmative determination in step 314, the control process proceeds to step 316 where k is set equal to zero. In step 318, the value of n is updated to equal n+1. The number n is update once each 20 measurements and conversions of the A/D which occurs once every 2 msec. In step 320, the following values are established:

aSUM(n) = aSUMc,
bSUM(n) = bSUMc, and
cSUM(n) = cSUMc.

In step 322 the sums of the current measurement window are set equal to zero:

aSUMc = 0,
bSUMc = 0, and
cSUMc = 0.

In step 324, the following calculations are performed:

$$\text{mean}(n) = \frac{\sum_{j=0}^{5} aSUM(n-j)}{120}$$

$$M = \text{mean}(n) + (\text{mean}(n) + \text{mean}(n-1))$$

The term aSUM(n) represents the sum of the latest 20 measurements by the A/D converter. The term aSUM(n-1) represents the sum of the first previous 20 measurements by the A/D converter. The term aSUM(n-2) represents the sum of the second previous 20 measurements made by the A/D converter, and so on. The term mean(n-1) in the calculation of m is the mean value that was calculated for the 120 measurements made just prior to the latest update of the 120 measurements by the 20 newest measurements. The term M provides a predicted average for the next 20 measurements based on the mean value of the latest 120 measurements.

The control process proceeds to step 326 where the total energy of the crash including the DC component, designated bSUMTOT, is calculated and the energy of the crash absent the DC component, designated cSUMTOT is calculated according to the following algorithms:

$$bSUMTOT = \sum_{j=0}^{8} bSUM(n-j) \times W1(j)$$

and $$cSUMTOT = cPART2 + \sum_{j=0}^{2} cSUM(n-j) \times W2(j) .$$

where $$cPART2 = cPART2 + cSUMc \text{ since } t = T0$$

The value bSUMTOT is functionally related to the total kinetic energy of the crash dissipated in the vehicle body. The value cSUMTOT is functionally related to the kinetic energy of the crash dissipated through deformation of the vehicle body. The terms W1(j) and W2(j) in the two algorithms for bSUMTOT and cSUMTOT are weighting factors that are designed to give the most importance to the latest group of 20 measured values from the current measurement window. Recall that the term (n) is for the latest 20 measurements and (n-1) is for the first prior 20 measurements and (n-2) is for the second prior 20 measurements, etc. The weighting factors, in accordance with a preferred embodiment of the present invention, are as follows:

| | |
|---|---|
| W1(0) | = 7 |
| W1(1) | = 6 |
| W1(2) | = 5 |
| W1(3) | = 4 |
| W1(4) | = 4 |
| W1(5) | = 4 |
| W1(6) | = 3 |
| W1(7) | = 2 |
| W1(8) | = 1 |
| W2(0) | = 6 |
| W2(1) | = 4 and |
| W2(3) | = 2. |

Therefore, bSUMTOT is equal to:

$(bSUM(n) \times 7) + (bSUM(n-1) \times 6) + (bSUM(n-2) \times 5) +$ $(bSUM(n-3) \times 4) + (bSUM(n-4) \times 4) + (bSUM(n-5) \times 4) +$ $(bSUM(n-6) \times 3) + (bSUM(n-7) \times 2) + (bSUM(n-8) \times 1).$ Furthermore, cSUMTOT is equal to:

$(cSUM(n) \times 6) + (cSUM(n-1) \times 4) + (cSUM(n-2) \times 2).$

The control process proceeds to step 328 where a determination is made as to whether the STARTED flag is set to true, i.e., whether the braking force has been equal to or greater than 2 G's. If the determination is negative, the control process loops back to step 302 where further measurements of the output of the accelerometer assembly are made.

If the determination in step 312 is affirmative, the control process proceeds to step 350 where the STARTED flag is set to T (true), T0 is set to the present time, the value of the velocity is set equal to zero, and the value of cPART2 is set equal to zero. The control process proceeds to step 352 from step 350 or an affirmative determination in step 310. In step 352, the velocity, VEL, is determined and the cPART2 is determined in accordance with the following algorithms:

$$CPART2 = cPART2 + |a(i) - M|$$

$$VEL = VEL + a(i)$$

where the term a(i) refers to the current measurement from the A/D converter.

The control process proceeds to step 354 where a determination is made as to whether the FIRE-ON-VEL flag is false. Since the FIRE-ON-VEL flag was initially set equal to false in step 300, the determination in step 354 is affirmative. The control process proceeds to step 356 where a determination is made as to whether the velocity determined in step 352 is less than a predetermined threshold value equal to V. If the determination is negative, the FIRE-ON-VEL flag is set to T (true) in step 358 and the control process proceeds to step 360 where a determination is made as to whether the FIRE-ON-SUMS flag is set to true. If the FIRE-ON-SUMS flag is still false from the setting in step 300, the control process proceeds to step 314. The control process also proceeds to step 314 from an affirmative determination in step 356.

If the determination in step 328 is affirmative, the control process proceeds to step 380 where a determination is made as to whether the time elapsed since time T0 is less than or equal to a first time limit T1. If the determination in step 380 is affirmative, meaning that time T1 has not yet occurred, the control process proceeds to step 382 where a determination is made as to whether the FIRE-ON-SUMS flag is false. If the determination in step 382 is negative, the control process proceeds back to step 302. If the determination in step 382 is affirmative, the control process proceeds to step 384 where a determination is made as to whether the values of bSUMTOT and cSUMTOT determined in step 326 is equal to or greater than X1 and X2, respectively. If the determination in step 384 is negative, the control process loops back to step 302. If the determination in step 384 is affirmative, the control process proceeds to step 386 where the FIRE-ON-SUMS flag is set equal to true. The control process proceeds from step 386 back to step 302.

If the determination in step 380 is negative, meaning that the elapsed time from time T0 is greater than T1, the control process proceeds to step 390 where a determination is made as to whether the elapsed time since T0 is equal to or greater than time T0 plus a second time T2. If the determination in step 390 is negative meaning that time T2 has not yet occurred, the control process loops back to step 302. If the determination in step 390 is affirmative, the control process proceeds to step 392 where the STARTED flag, the FIRE-ON-SUMS flag, and the FIRE-ON-VEL flag are reset to F (false). The next time the process proceeds through step 310, the determination will be negative. If the vehicle deceleration is greater than 2 G's, the process proceeds to step 350 where the VEL and cPART2 are reset to zero. However, the VEL and cPart2 can be reset to a value other than zero such as a value functionally related to their previous values. This process would provide retention of information regarding a continuing event.

If the determination in step 360 is affirmative, which means that both the FIRE-ON-SUMS flag and the FIRE-ON-VEL flag are true, the program proceeds to step 396 where the actuation signal is provided to actuate the actuatable passenger restraint system. The actuation signal in step 396 is provided only when both the aSUMTOT and the bSUMTOT equal or exceed their respective predetermined limits within the time interval between T0 and T1 and the velocity value equals or exceeds its predetermined limit within the time period between T0 and T2.

Referring to FIGS. 10 and 11, a composite graphical representation is shown of the accelerometer signal, the result of the velocity algorithm, the result of the bSUMTOT algorithm, and the result of the cSUMTOT algorithm. Amplitude is on the Y-axis and time is on the X-axis. Each of the graph lines is labeled. FIG. 10 represents a non-deployment crash condition and FIG. 11 represents a deployment crash condition. Each graph line shown in FIGS. 10 and 11 is made up of a plurality of individual points which are connected by a line wherein each point of an associated graph line represents the result of its algorithm at that associated point in time.

The limits X1, X2, and V, which are used in the control process, are determined by empirical methods. A vehicle of the type in which the invention is used is repeatedly subjected to various types of both deployment and non-deployment crash conditions. The values of velocity, bSUMTOT, and cSUMTOT are determined and plotted for each of the types of crash conditions. Based upon the plurality of empirically derived graphs, threshold values are selected so as to insure that an actuation signal will be provided in time to achieve adequate occupant protection when that type of vehicle is subjected to a deployment crash condition and no actuation signal will be provided in a non-deployment crash condition. The selected threshold values are stored in the internal memory of the microcomputer 254.

Since the threshold values depend upon the particular type of vehicle, empirical crash data must be obtained for each type of vehicle on which the invention will be used.

As previously noted, FIG. 10 depicts a non-deployment crash condition. When the braking force equals or exceeds the 2 G level, the time is marked as T0. At that point in time, the velocity value is set equal to zero and the term cPART2 is set equal to zero. As can be seen from the graph, the value of cSUMTOT does exceed its associated limit X2 before the time T1 occurs. However, as can also be seen from the graph, the value of bSUMTOT does not equal nor exceed its associated limit X1 before the occurrence of the time T1. The velocity does exceed its associated limit V before the time T2. However, the actuation signal is not provided to actuate the passenger restraint system because of the failure of the bSUMTOT to equal or exceed its limit value X1 before the time T1.

FIG. 11, as previously noted, depicts a deployment crash condition. When the braking force equals or exceeds the 2 G level, the time is marked as T0. At that point in time, the velocity value is set equal to zero and the term cPART2 is set equal to zero. As can be seen from the graph, the value of cSUMTOT does exceed its associated limit X2 before the time T1 occurs. As can also be seen from the graph, the value of bSUMTOT does exceed its associated limit X1 before the occurrence of the time T1. The velocity does exceed its associated lime V before the time T2. The actuation signal is provided to actuate the passenger restraint system because the three criteria, i.e., the velocity (aSUM), the bSUMTOT, and the cSUMTOT, all equal or exceed their associated limits within their associated time periods. The passenger restraint actuation signal is provided at the later of the time when VEL exceeds its limit or both bSUMTOT and cSUMTOT simultaneously exceed their limits.

Although the specific example used to describe the second embodiment of the present invention required that the VEL, the bSUMTOT, and the cSUMTOT all equal or exceed their associated limits within their associated time periods, the invention is not so limited. It has been discovered that for certain vehicles, the bSUMTOT or the cSUMTOT alone can be used to discriminate between a crash of sufficient violence that the air bag is needed to protect the vehicle occupants and a non-deployment crash. Therefore, for certain types of vehicles, it is possible to monitor for one kinetic energy value and to compare that kinetic energy value against a predetermined limit.

In accordance with another embodiment of the present invention, the energy of the crash is determined by integrating the power spectral density value over all frequencies of the analog voltage value of the electric signal from transducer. The integral of the power spectral density is functionally related to the crash energy of the vehicle during a crash condition. Predetermined frequency values present in said time varying signal can be eliminated from the power spectral density integration for determination of a part of the crash energy similar to the cSUMTOT calculation described above. It will be appreciated by one skilled in the art that the frequency at zero hertz can be eliminated from the power spectral density calculation to remove the DC component from the crash in a way similar to that described above.

This invention has been described with reference to preferred embodiments. Modifications and alterations may occur to others upon reading and understanding this specification. For example, the preferred embodiments of the present invention have been described with regard to actuation of an airbag restraint system. The method and apparatus of the present invention is just as applicable to other passenger restraint systems. For example, the actuation signal can be used to lock a seat belt in a lockable seat belt system or to actuate a pretensioner for a seat belt retractor in a seat belt system. Also, the invention has been described with reference to a microcomputer. It will be appreciated by those skilled in the art that the functions performed by the microcomputer can be accomplished using discrete circuitry. Also, it is contemplated that the invention can be embodied in an "application specific integrated circuit" known in the art as an ASIC. The words "acceleration" and "deceleration" are used interchangeably. Those skilled in the art will realize that the difference lies only in one's frame of reference. It is our intention to include in our invention all modifications and alterations insofar as they come within the scope of the appended claims and the equivalents thereof.

Having fully described our invention, we claim:

1. An apparatus for providing a passenger restraint actuation signal for use in controlling actuation of a passenger restraint system in a vehicle, said apparatus comprising:

sensing means mounted to the vehicle body for sensing a vehicle crash condition, said sensing means providing a time varying electric signal having an electrical characteristic functionally related to the vehicle crash deceleration;

means for determining from said time varying electric signal at least one energy value functionally related to the energy of the crash dissipated in the vehicle body;

timing means for providing a time signal;

means for comparing within a time period timed by said timing means the determined at least one energy value against an associated limit indicative of a maximum energy level beyond which the passenger restraint device needs to be actuated to maximize protection of the passengers; and means for providing said passenger restraint actuation signal when said comparing means indicates that at least one of the compared energy values is equal to or greater than its associated limit within said time period.

2. The apparatus of claim 1 wherein said means for determining said at least one energy value includes means for determining the RMS value of the analog voltage value of said electric signal from said sensing means, the RMS value being functionally related to the crash energy of the vehicle during a crash condition.

3. The apparatus of claim 1 wherein said means for determining said at least one energy value includes means for measuring the analog voltage value of said electric signal from said sensing means at a plurality of different times, means for converting each of said measured analog voltage values into a corresponding digital value, means for summing the absolute value of each of said digital values to determine a summed digital value functionally related to the total energy value dissipated in the vehicle body, said comparing means comparing the summed digital value against the associated limit for the at least one energy value.

4. The apparatus of claim 3 further comprising means for multiplying each determined at least one energy value by a weighting factor so as to give certain acquired data measurements a value greater than other determined energy values, means for summing the weighted energy values together to determine a sum total value, said comparing means comparing the sum total value against a predetermined value.

5. The apparatus of claim 4 wherein the weighting factors are selected to give the most weight to the most recent acquired data.

6. The apparatus of claim 1 wherein said means for determining said at least one energy value includes means for measuring the analog voltage value of said electric signal from said sensing means at a plurality of different times, means for converting each of said measured analog voltage values into a corresponding digital value, means for determining an averaging value functionally related to the mean value of a predetermined number of the most recent of the measured values of the electric signal from said sensing means, means for subtracting the averaging value from each of the measured values, means for summing the absolute value of each of said digital values minus the averaging value to determine a sum functionally related to the total energy value of the crash dissipated in the vehicle body excluding the energy resulting from the zero hertz frequency of the time varying electronic signal, said comparing means comparing the resultant summed absolute value against the associated limit for the energy value.

7. The apparatus of claim 6 further comprising means for multiplying each determined energy value by a weighting factor so as to give certain acquired data measurements a value greater than other determined energy values, means for summing the weighted energy values together to determine a sum total value, said comparing means comparing the sum total value against the associated limit for the energy value.

8. The apparatus of claim 7 wherein the weighting factors are selected to give the most weight to the most recent acquired data.

9. The apparatus of claim 1 further including means for measuring an analog voltage value of said time varying electric signal at a plurality of discrete times over a predetermined time interval, means for converting each of the measured analog voltage values into a digital value, means for determining the energy value, means for storing a predetermined number of said values in memory, means for combining the stored values into a sum total value, said comparing means comparing the sum total value against the associated limit for the energy value.

10. The apparatus of claim 9 further including means to update a portion of said stored digital values by replacing a portion of the stored digital values with newly determined digital values, said means for determining the sum total value making their determinations based upon the updated stored digital values.

11. The apparatus of claim 1 wherein said means for determining from said time varying electric signal at least one energy value functionally related to the energy of the crash dissipated in the vehicle body includes means for excluding from said energy determination energy resulting from zero hertz frequency in said time varying signal.

12. The apparatus of claim 1 wherein said means for determining said at least one energy value includes means for determining the integral of the power spectral density over all frequencies of the analog voltage value of said electric signal from said sensing means, the integral of the power spectral density being functionally related to the crash energy of the vehicle during a crash condition.

13. The apparatus of claim 12 wherein said means for determining said integral of the power spectral density includes means for excluding from said determination energy resulting from at least one predetermined frequency in said time varying signal.

14. The apparatus of claim 13 wherein the frequency eliminated is zero hertz.

15. The apparatus of claim 1 wherein said means for determining said at least one energy includes means for sensing when the vehicle deceleration is greater than a predetermined value, a comparison of said at least one energy value against an associated limit not beginning until said sensed vehicle deceleration is greater than said predetermined value.

16. The apparatus of claim 1 wherein said means for determining said at least one energy value includes means for measuring the analog voltage value of said electric signal from said sensing means at a plurality of different times, means for converting each of said measured analog voltage values into a corresponding digital value, means for squaring the individual digital values, summing the squared values and taking the square root of the sum of the squares, said comparing means comparing the square root of the sum of the squares against the associated limit for the at least one energy value.

17. An apparatus for providing a passenger restraint actuation signal for use in controlling actuation of a passenger restraint system in a vehicle, said apparatus comprising:

sensing means mounted to the vehicle body for sensing a vehicle crash condition, said sensing means providing a time varying electric signal having an electrical characteristic proportional to the vehicle crash deceleration;

means for determining from said time varying electric signal at least one energy value functionally related to the energy of the crash dissipated in the vehicle body;

means for determining from said time varying electric signal a vehicle velocity value;

means for comparing the determined at least one energy value and the vehicle velocity value against associated limits; and means for providing said passenger restraint actuation signal when said comparing means indicates that each of the compared values is equal to or greater than its associated limit.

18. The apparatus of claim 17 further comprising timing means for providing a timing signal and wherein said means for comparing compares said at least one energy value and said velocity value against their associated limits within associated time periods.

19. The apparatus of claim 18 wherein said means for determining said velocity value is reset to a predetermined value when said timing signal times out.

20. The apparatus of claim 17 wherein said means for determining said at least one energy value includes means for determining the RMS value of the analog voltage value of said electric signal from said sensing means, the RMS value being functionally related to the crash energy of the vehicle during a crash condition.

21. The apparatus of claim 17 wherein said means for determining said at least one energy value includes means for measuring the analog voltage value of said electric signal from said sensing means at a plurality of different times, means for converting each of said measured analog voltage values into a corresponding digital value, means for summing the absolute value of each of said digital values to determine a summed digital value functionally related to the total energy value dissipated in the vehicle body, said comparing means comparing the summed digital value against the associated limit for the at least one energy value.

22. The apparatus of claim 21 further comprising means for multiplying each determined at least one energy value by a weighting factor so as to give certain acquired data measurements a value greater than other determined energy values, means for summing the weighted energy values together to determine a sum total value, said comparing means comparing the sum total value against a predetermined value.

23. The apparatus of claim 17 wherein said means for determining said at least one energy value includes means for measuring the analog voltage value of said electric signal from said sensing means at a plurality of different times, means for converting each of said measured analog voltage values into a corresponding digital value, means for determining an averaging value functionally related to the mean value of a predetermined number of the most recent of the measured values of the electric signal from said sensing means, means for subtracting the averaging value from each of the measured values, means for summing the absolute value of each of said digital values minus the averaging value to determine a sum functionally related to the total energy value of the crash dissipated in the vehicle body excluding the energy resulting from the zero hertz frequency of the time varying electronic signal, said comparing means comparing the resultant summed absolute value against the associated limit for the energy value.

24. The apparatus of claim 23 further comprising means for multiplying each determined at least one energy value by a weighting factor so as to give certain acquired data measurements a value greater than other determined energy values, means for summing the weighted energy values together to determine a sum total value functionally related to the energy value dissipated in the vehicle body minus energy at zero hertz, said comparing means comparing the sum total value against a predetermined value.

25. The apparatus of claim 17 further including means for measuring an analog voltage value of said time varying electric signal at a plurality of discrete times over a predetermined time interval, means for converting each of the measured analog voltage values into a digital value, means for determining the energy value, means for storing a predetermined number of said values in memory, means for combining the stored values into a sum total value, said comparing means comparing the sum total value against the associated limit for the energy value.

26. The apparatus of claim 25 further including means to update a portion of said stored digital values by replacing a portion of the stored digital values with newly determined digital values, said means for determining the sum total value making their determinations based upon the updated stored digital values.

27. The apparatus of claim 17 wherein said means for determining from said time varying electric signal at least one energy value functionally related to the energy of the crash dissipated in the vehicle body includes means for excluding from said energy determination energy resulting from at least one predetermined frequency in said time varying signal.

28. The apparatus of claim 27 wherein the frequency eliminated is zero hertz.

29. The apparatus of claim 17 wherein said means for determining said at least one energy value includes means for determining the integral of the power spectral density over all frequencies of the analog voltage value of said electric signal from said sensing means, the integral of the power spectral density being functionally related to the crash energy of the vehicle during a crash condition.

30. The apparatus of claim 29 wherein said means for determining said integral of the power spectral density includes means for excluding from said determination energy resulting from at least one predetermined frequency in said time varying signal.

31. The apparatus of claim 30 wherein the frequency eliminated is zero hertz.

32. The apparatus of claim 17 wherein said means for determining said at least one energy includes means for sensing when the vehicle deceleration is greater than a predetermined value, a comparison of said at least one energy value against an associated limit not beginning until said sensed vehicle deceleration is greater than said predetermined value.

33. The apparatus of claim 17 wherein said means for determining said at least one energy value includes means for measuring the analog voltage value of said electric signal from said sensing means at a plurality of different times, means for converting each of said measured analog voltage values into a corresponding digital value, means for squaring the individual digital values, summing the squared values and taking the square root of the sum of the squares, said comparing means comparing the square root of the sum of the squares against the associated limit for the at least one energy value.

34. An apparatus for providing a passenger restraint actuation signal for use in controlling actuation of a passenger restraint system in a vehicle, said apparatus comprising:
sensing means mounted to the vehicle body for sensing a vehicle crash condition, said sensing means providing a time varying electric signal having an electrical characteristic proportional to the vehicle crash deceleration;
means for determining from said time varying electric signal a first energy value functionally related to the total energy of the crash dissipated in the vehicle body;
means for determining from said time varying electric signal a second energy value functionally related to the energy of the crash dissipated in the vehicle body minus the energy associated with at least one predetermined frequency band;
means for determining a vehicle velocity value from said time varying electric signal;
means for comparing the determined first energy value, the second energy value, and the vehicle velocity value against associated limits; and
means for providing said passenger restraint actuation signal when said comparing means indicates that each of the compared values is equal to or greater than its associated limit.

35. The apparatus of claim 34 further comprising timing means for providing a timing signal and wherein said means for comparing compares said first energy value, said second energy value, and said velocity value against their associated limits within associated time periods.

36. The apparatus of claim 35 wherein said means for determining said velocity value are reset to a predetermined values when said timing signal times out.

37. The apparatus of claim 35 wherein said means for determining said second energy value, and said means for determining said velocity value are reset to associated predetermined values when said timing signal times out.

38. The apparatus of claim 34 wherein said means for determining said first energy value includes means for determining the RMS value of the analog voltage value of said electric signal from said sensing means, the RMS value being functionally related to the total crash energy of the vehicle during a crash condition.

39. The apparatus of claim 34 wherein said means for determining said first energy value includes means for measuring the analog voltage value of said electric signal from said sensing means at a plurality of different times, means for converting each of said measured analog voltage values into a corresponding digital value, means for summing the absolute value of each of said digital values to determine a summed digital value, said comparing means comparing the summed digital value against the associated limit for the first energy value.

40. The apparatus of claim 39 further comprising means for multiplying each determined first energy value by a weighting factor so as to give certain acquired data measurements a value greater than other determined first energy values, means for summing the weighted energy values together to determine a sum total value first energy value, comparing means comparing the sum total value against a predetermined value.

41. The apparatus of claim 34 wherein said means for determining said second energy value includes means for measuring the analog voltage value of said electric signal from said sensing means at a plurality of different times, means for converting each of said measured analog voltage values into a corresponding digital value, means for determining an averaging value functionally related t the mean value of a predetermined number of the most recent of the measured values of the electric signal from said sensing means, means for subtracting the averaging value from each of the measured values, means for summing the absolute value of each of said digital values minus the averaging value to determine a summed absolute value functionally related to the energy value dissipated in the vehicle body minus energy resulting from the presence of predetermined frequency components, said comparing means comparing the resultant summed absolute value against the associated limit for the second energy value.

42. The apparatus of claim 41 further comprising means for multiplying each determined second energy value by a weighting factor so as to give certain acquired data measurements a value greater than other determined second energy values, means for summing the second weighted energy values together to determine a sum total value, said comparing means comparing the sum total second energy value against an associated limit for the second energy value.

43. The apparatus of claim 34 further including means for measuring an analog voltage value of said time varying electric signal at a plurality of discrete times over a predetermined time interval, means for converting each of the measured analog voltage values into a digital value, means for determining the first and second energy values, means for storing a predetermined number of said values in memory, means for combining the stored values into a sum total first energy value and a sum total second energy value, said comparing means comparing the sum total values against each associated limit for the energy value.

44. The apparatus of claim 43 further including means to update a portion of said stored digital values by replacing a portion of the stored digital values with newly determined digital values, said means for determining the total first and second energy values making their associated determinations based upon the updated stored digital values.

45. The apparatus of claim 44 wherein said means for determining from said time varying electric signal said second energy value functionally related to the energy of the crash dissipated in the vehicle body includes means for excluding from said second energy determination energy resulting from at least one predetermined frequency in said time varying signal.

46. The apparatus of claim 45 wherein the frequency eliminated is zero hertz.

47. The apparatus of claim 34 wherein said means for determining said first energy value includes means for determining the integral of the power spectral density over all frequencies of the analog voltage value of said electric signal from said sensing means, the integral of the power spectral density being functionally related to the total crash energy of the vehicle during a crash condition.

48. The apparatus of claim 34 wherein said means for determining said second energy value includes means for determining the integral of the power spectral density over selected frequencies of the analog voltage value of said electric signal from said sensing means, the integral of the power spectral density being functionally related to part of the crash energy of the vehicle during a crash condition.

49. The apparatus of claim 48 wherein said means for determining said integral of the power spectral density includes means for excluding from said determination energy resulting from at least one predetermined frequency in said time varying signal.

50. The apparatus of claim 49 wherein the frequency eliminated is zero hertz.

51. The apparatus of claim 34 wherein said means for determining said first energy, said second energy, and said velocity includes means for sensing when the vehicle deceleration is greater than a predetermined value, a comparison of said first energy, said second energy, and said velocity value against an associated limit not beginning until said sensed vehicle deceleration is greater than said predetermined value.

52. The apparatus of claim 34 wherein said means for determining said first energy value includes means for measuring the analog voltage value of said electric signal from said sensing means at a plurality of different times, means for converting each of said measured analog voltage values into a corresponding digital value, means for squaring the individual digital values, summing the squared values and taking the square root of the sum of the squares, said comparing means comparing the square root of the sum of the squares against the associated limit for the at least one energy value.

53. The apparatus of claim 34 wherein said means for determining said second energy value includes means for measuring the analog voltage value of said electric signal from said sensing means at a plurality of different times, means for converting each of said measured analog voltage values into a corresponding digital value, means for determining the mean value of the measured values, means for subtracting the mean value from the measured values, means for squaring the individual digital values, means for squaring the result of the subtraction, summing the squared values and taking the square root of the sum of the squares, said comparing means comparing the square root of the sum of the squares against the associated limit for the second energy value.

54. A method for providing a passenger restraint actuation signal for use in controlling actuation of a passenger restraint system in a vehicle, said method comprising the steps of:
    mounting a sensor to the vehicle for sensing a vehicle crash condition, said sensor providing a time varying electric signal having an electrical characteristic functionally related to the vehicle crash deceleration;
    providing a timing signal for timing out a predetermined time period;
    determining from said time varying electric signal at least one energy value functionally related to the energy of the crash dissipated in the vehicle body;
    comparing within said predetermined time period said determined at least one energy value against an associated limit indicative of a maximum energy level beyond which the passenger restraint device needs to be actuated to maximize protection of the passengers; and
    providing said passenger restraint actuation signal when said comparing step indicates that at least one of the compared energy values is equal to or greater than its associated limit within said predetermined time period.

55. The method of claim 54 wherein said step of determining said at least one energy value includes determining the RMS value of the analog voltage value of said time varying electric signal, the RMS value being functionally related to the crash energy of the vehicle during a crash condition.

56. The method of claim 54 wherein said step of determining said at least one energy value includes the steps of measuring the analog voltage value of said time varying electric signal at a plurality of different times, converting each of said measured analog voltage values into a corresponding digital value, summing the absolute value of each of said digital values to determine a summed digital value functionally related to the total energy value dissipated in the vehicle body, and comparing the summed digital value against the associated limit for the at least one energy value.

57. The method of claim 56 further comprising the steps of multiplying each determined at least one energy value by a weighting factor so as to give certain acquired data measurements a value greater than other determined energy values, summing the weighted energy values together to determine a sum total value, and wherein the step of comparing compares the sum total value against a predetermined value.

58. The method of claim 54 wherein said step of determining said at least one energy value includes the steps of measuring the analog voltage value of said time varying electric signal at a plurality of different times, converting each of said measured analog voltage values into a corresponding digital value, determining an averaging value functionally related to the mean value of a predetermined number of the most recent the measured values of the time varying electric, subtracting the averaging value from each of the measured values, summing the absolute value of each of said digital values minus the averaging value to determine a sum functionally related to the total energy value of the crash dissipated in the vehicle body excluding the energy resulting from the zero hertz frequency of the time varying electronic signal, and wherein the step of comparing compares the resultant summed absolute value against the associated limit for the energy value.

59. The method of claim 58 further comprising the steps of multiplying each determined energy value by a weighting factor so as to give certain of the acquired data measurements a value greater than other of the energy values, summing the weighted energy values together to determine a sum total value, said step of comparing comparing the sum total value against the associated limit for the energy value.

60. The method of claim 54 further including steps of measuring an analog voltage value of said time varying electric signal at a plurality of discrete times over a predetermined time interval, converting each of the measured analog voltage values into a digital value, determining the energy value, storing a predetermined number of said values in memory, combining the stored values into a sum total value, said step of comparing comparing the sum total value against the associated limit for the energy value.

61. The method of claim 60 further including the steps of updating a portion of said stored digital values by replacing a portion of the stored digital values with newly determined digital values, said step of determining the sum total value making the determinations based upon the updated stored digital values.

62. The method of claim 54 wherein said step of determining from said time varying electric signal at least one energy value functionally related to the energy of the crash dissipated in the vehicle body includes the step of excluding from said energy determination energy resulting from zero hertz frequency in said time varying signal.

63. The method of claim 54 wherein said step of determining said at least one energy value includes determining the integral of the power spectral density over all frequencies of the time varying electric signal, the integral of the power spectral density being functionally related to the crash energy of the vehicle during a crash condition.

64. The method of claim 63 wherein said step of determining said integral of the power spectral density includes excluding from said determination energy resulting from at least one predetermined frequency in said time varying signal.

65. The method of claim 64 wherein the frequency eliminated is zero hertz.

66. The method of claim 54 wherein said step of determining said at least one energy includes sensing when the vehicle deceleration is greater than a predetermined value, a comparison of said at least one energy value against an associated limit not beginning until said sensed vehicle deceleration is greater than said predetermined value.

67. The method of claim 54 wherein said step of determining said at least one energy value includes measuring the analog voltage value of said time varying electric signal at a plurality of different times, converting each of said measured analog voltage values into a corresponding digital value, squaring the individual digital values, summing the squared values and taking the square root of the sum of the squares, said step of comparing comparing the square root of the sum of the squares against the associated limit for the at least one energy value.

68. A method for providing a passenger restraint actuation signal for use in controlling actuation of a passenger restraint system in a vehicle, said method comprising the steps of:
mounting a sensor to the vehicle for sensing a vehicle crash condition, said sensor providing a time varying electric signal having an electrical characteristic proportional to the vehicle crash deceleration;
determining from said time varying electric signal at least one energy value functionally related to the energy of the crash dissipated in the vehicle body;
determining from said time varying electric signal a vehicle velocity value;
comparing the determined at least one energy value and the vehicle velocity value against associated limits; and
providing said passenger restraint actuation signal when said comparing step indicates that each of the compared values is equal to or greater than its associated limit.

69. The method of claim 68 further comprising the steps of providing a timing signal and said step of comparing compares said at least one energy value and said velocity value against their associated limits within associated time periods.

70. The apparatus of claim 69 wherein said step of determining said velocity value are reset to a predetermined value when said timing signal times out.

71. The method of claim 68 wherein said step of determining said at least one energy value includes determining the RMS value of the analog voltage value of said time varying electric signal, the RMS value being functionally related to the crash energy of the vehicle during a crash condition.

72. The method of claim 68 wherein said step of determining said at least one energy value includes measuring the analog voltage value of said time varying electric signal at a plurality of different times, converting each of said measured analog voltage values into a corresponding digital value, summing the absolute value of each of said digital values to determine a summed digital value functionally related to the total energy value dissipated in the vehicle body, said step of comparing comparing the summed digital value against the associated limit for the at least one energy value.

73. The method of claim 72 further comprising the steps of multiplying each determined at least one energy value by a weighting factor so as to give certain acquired data measurements a value greater than other determined energy values, summing the weighted energy values together to determine a sum total value, said step of comparing comparing the sum total value against a predetermined value.

74. The method of claim 68 wherein said step of determining said at least one energy value includes measuring the analog voltage value of said time varying electric signal at a plurality of different times, means for converting each of said measured analog voltage values into a corresponding digital value, determining an averaging value functionally related to the mean value of a predetermined number of the measured values of the time varying electric signal, subtracting the averaging value from each of the measured values, summing the absolute value of each of said digital values minus the averaging value to determine a sum functionally related to the total energy value of the crash dissipated in the vehicle body excluding the energy resulting from the zero hertz frequency of the time varying electronic signal, said step of comparing comparing the resultant summed absolute value against the associated limit for the energy value.

75. The method of claim 74 further comprising the step of multiplying each determined energy value by a weighting factor so as to give certain acquired data measurements a value greater than other determined energy values, summing the weighted energy values together to determine a sum total value, said step of comparing comparing the sum total value against the associated limit for the energy value.

76. The method of claim 68 further including the steps of measuring an analog voltage value of said time varying electric signal at a plurality of discrete times over a predetermined time interval, converting each of the measured analog voltage values into a digital value, determining the energy value, storing a predetermined number of said values in memory, combining the stored values into a sum total value, said step of comparing comparing the sum total value against the associated limit for the energy value.

77. The method of claim 76 further including the steps of updating a portion of said stored digital values by replacing a portion of the stored digital values with newly determined digital values, said step of determining the sum total value making the determinations based upon the updated stored digital values.

78. The method of claim 68 wherein said step of determining from said time varying electric signal at least one energy value functionally related to the energy of the crash dissipated in the vehicle body includes excluding from said energy determination energy resulting from at least one predetermined frequency in said time varying signal.

79. The method of claim 78 wherein the frequency eliminated is zero hertz.

80. The method of claim 68 wherein said step of determining said at least one energy value includes determining the integral of the power spectral density over all frequencies of the analog voltage value of said time varying electric signal, the integral of the power spectral density being functionally- related to the crash energy of the vehicle during a crash condition.

81. The method of claim 80 wherein said step of determining said integral of the power spectral density includes excluding from said determination energy resulting from at least one predetermined frequency in said time varying signal.

82. The method of claim 81 wherein the frequency eliminated is zero hertz.

83. The method of claim 68 wherein said step of determining said at least one energy includes sensing when the vehicle deceleration is greater than a predetermined value, a comparison of said at least one energy value against an associated limit not beginning until said sensed vehicle deceleration is greater than said predetermined value.

84. The method of claim 68 wherein said step of determining said at least one energy value includes measuring the analog voltage value of said time varying electric signal at a plurality of different times, converting each of said measured analog voltage values into a corresponding digital value, squaring the individual digital values, summing the squared values and taking the square root of the sum of the squares, said step of comparing comparing the square root of the sum of the squares against the associated limit for the at least one energy value.

85. A method for providing a passenger restraint actuation signal for use in controlling actuation of a passenger restraint system in a vehicle, said method comprising the steps of:
  mounting a sensor to the vehicle for sensing a vehicle crash condition, said sensor providing a time varying electric signal having an electrical characteristic proportional to the vehicle crash deceleration;
  determining from said time varying electric signal a first energy value functionally related to the total energy of the crash dissipated in the vehicle body;
  determining from said time varying electric signal a second energy value functionally related to the total energy of the crash dissipated in the vehicle body minus the energy associated with at least one predetermined frequency band;
  determining a vehicle velocity value from said time varying electric signal;
  comparing the determined first energy value, the second energy value, and the vehicle velocity value against associated limits; and
  providing said passenger restraint actuation signal when said comparing step indicates that each of the compared values is equal to or greater than its associated limit.

86. The method of claim 85 further comprising the steps of providing a timing signal and wherein said step of comparing compares said first energy value, said second energy value, and said velocity value against their associated limits within associated time periods.

87. The apparatus of claim 86 wherein said step of determining said velocity value are reset to a predetermined values when said timing signal times out.

88. The apparatus of claim 86 wherein said step of determining said second energy value, and said step of determining said velocity value are reset to associated predetermined values when said timing signal times out.

89. The method of claim 85 wherein said step of determining said first energy value includes determining the RMS value of the analog voltage value of said time varying electric signal, the RMS value being functionally related to the total crash energy of the vehicle during a crash condition.

90. The method of claim 85 wherein said step of determining said first energy value includes measuring the analog voltage value of said time varying electric signal at a plurality of different times, converting each of said measured analog voltage values into a corresponding digital value, summing the absolute value of each of said digital values to determine a summed digital value functionally related to the total energy value dissipated in the vehicle body, said step of comparing comparing the summed digital value against the associated limit for the first energy value.

91. The method of claim 90 further comprising the step of multiplying each determined first energy value by a weighting factor so as to give certain acquired data measurements a value greater than other determined first energy values previously determined, summing the weighted energy values together to determine a sum total first energy value, said step of comparing comparing the sum total first energy value against an associated predetermined value.

92. The method of claim 85 wherein said step of determining said second energy value includes measuring the analog voltage value of said time varying electric signal at a plurality of different times, converting each of said measured analog voltage values into a corresponding digital value, determining an averaging value functionally related to the mean value of a predetermined number of the most recent of the measured values of the time varying electric signal, subtracting the averaging value from each of the measured values, summing the absolute value of each of said digital values minus the averaging value to determine a summed absolute value functionally related to the energy value of the crash dissipated in the vehicle body minus energy resulting from the presence of predetermined frequency components, said step of comparing comparing the resultant summed absolute value against the associated limit for the second energy value.

93. The method of claim 92 further comprising the steps of multiplying each determined energy value by a weighting factor so as to give certain acquired data measurements a value greater than other determined second energy values, summing the weighted second energy values together to determine a sum total value, said step of comparing comparing the sum total second energy value against the associated limit for the second energy value.

94. The method of claim 85 further including the steps of measuring an analog voltage value of said time varying electric signal at a plurality of discrete times over a predetermined time interval, converting each of the measured analog voltage values into a digital value, determining the first and second energy values, storing a predetermined number of said values in memory, combining the stored values into a sum total first energy value and a sum total second energy value,. said step of comparing comparing the sum total values against the associated limit for each energy value.

95. The method of claim 94 further including the steps of updating a portion of said stored digital values by replacing a portion of the stored digital values with newly determined digital values, said step of determining the total first and second energy values making the associated determinations based upon the updated stored digital values.

96. The method of claim 85 wherein said step of determining from said time varying electric signal said second energy value functionally related to the energy of the crash dissipated in the vehicle body includes excluding from said second energy determination energy resulting from at least one predetermined frequency in said time varying signal.

97. The method of claim 96 wherein the frequency eliminated is zero hertz.

98. The method of claim 85 wherein said step of determining said first energy value includes determining the integral of the power spectral density over all frequencies of the analog voltage value of said time varying electric signal, the integral of the power spectral density being functionally related to the total crash energy of the vehicle during a crash condition.

99. The method of claim 85 wherein said step of determining said second energy value includes determining the integral of the power spectral density over selected frequencies of the analog voltage value of said time varying electric signal, the integral of the power spectral density being functionally related to part of the crash energy of the vehicle during a crash condition.

100. The method of claim 99 wherein said step of determining said integral of the power spectral density includes excluding from said determination energy resulting from at least one predetermined frequency in said time varying signal.

101. The method of claim 100 wherein the frequency eliminated is zero hertz.

102. The method of claim 85 wherein said step of determining said first energy, said second energy, and said velocity includes sensing when the vehicle deceleration is greater than a predetermined value, a comparison of said first energy, said second energy, and said velocity value against associated limits not beginning until said sensed vehicle deceleration is greater than said predetermined value.

103. The method of claim 85 wherein said step of determining said first energy value includes measuring the analog voltage value of said time varying electric signal at a plurality of different times, converting each of said measured analog voltage values into a corresponding digital value, squaring the individual digital values, summing the squared values and taking the square root of the sum of the squares, said step of comparing comparing the square root of the sum of the squares against the associated limit for the at least one energy value.

104. The method of claim 85 wherein said step of determining said second energy value includes measuring the analog voltage value of said time varying electric signal at a plurality of different times, converting each of said measured analog voltage values into a corresponding digital value, determining the mean value of the measured values, subtracting the mean value from the measured values, squaring the individual digital values, squaring the result of the subtraction, summing the squared values and taking the square root of the sum of the squares, said step of comparing comparing the square root of the sum of the squares against the associated limit for the second energy value.

* * * * *

UNITED STATES PATENT AND TRADEMARK OFFICE
CERTIFICATE OF CORRECTION

PATENT NO. : 5,216,607
DATED : June 1, 1993
INVENTOR(S) : Robert W. Diller, Mark A. Ross, Brian K. Blackburn and Joseph F. Mazur It is certified that error appears in the above-indentified patent and that said Letters Patent is hereby corrected as shown below:

Column 26, line 41, change "t" to --to--.

Column 27, line 13, change "44" to --34--.

Signed and Sealed this

Twenty-ninth Day of March, 1994

Attest:

BRUCE LEHMAN

*Attesting Officer*  *Commissioner of Patents and Trademarks*